United States Patent
Shinozaki et al.

(10) Patent No.: US 12,522,225 B2
(45) Date of Patent: Jan. 13, 2026

(54) SENSOR DIAGNOSTIC DEVICE

(71) Applicant: SUBARU CORPORATION, Tokyo (JP)

(72) Inventors: Tomoki Shinozaki, Tokyo (JP); Takuya Takashima, Tokyo (JP); Kunihiko Kuronuma, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 489 days.

(21) Appl. No.: 18/166,825

(22) Filed: Feb. 9, 2023

(65) Prior Publication Data

US 2023/0278568 A1  Sep. 7, 2023

(30) Foreign Application Priority Data

Mar. 2, 2022 (JP) ................................. 2022-032025

(51) Int. Cl.
*B60W 50/02* (2012.01)

(52) U.S. Cl.
CPC ... *B60W 50/0205* (2013.01); *B60W 2050/021* (2013.01); *B60W 2050/0215* (2013.01)

(58) Field of Classification Search
CPC ....... B60W 50/0205; B60W 2050/021; B60W 2050/0215; G01K 15/007
See application file for complete search history.

(56) References Cited

U.S. PATENT DOCUMENTS

2012/0259506 A1\* 10/2012 Klier ...................... B60T 8/885
701/33.9

FOREIGN PATENT DOCUMENTS

| JP | 2010-096023 | A | 4/2010 | | |
|---|---|---|---|---|---|
| JP | 2013-019484 | A | 1/2013 | | |
| JP | 2013-108404 | A | 6/2013 | | |
| JP | 2013108404 | | \* 6/2013 | ............ | F02D 45/00 |
| WO | WO 2015033694 | | \* 3/2015 | .......... | H01M 10/613 |

\* cited by examiner

*Primary Examiner* — Alexander Satanovsky
(74) *Attorney, Agent, or Firm* — Rimon P.C.

(57) ABSTRACT

A sensor diagnostic device for use in a vehicle including a first temperature sensor and a second temperature sensor includes a control system. The control system includes a processor and a memory communicably coupled to each other. The control system determines a sensor abnormality based on a detected temperature difference between a first detected temperature detected by the first temperature sensor and a second detected temperature detected by the second temperature sensor. After the vehicle is stopped, the control system calculates a decrease speed of the first detected temperature based on the first detected temperature, and calculate a decrease speed of the second detected temperature based on the second detected temperature, and if an absolute value of a decrease speed difference between the first and second detected temperatures is smaller than a threshold, determines whether the sensor abnormality has occurred, based on the detected temperature difference.

7 Claims, 18 Drawing Sheets

FIG. 9

| DIAGNOSIS CASE | WHETHER OFFSET ABNORMALITY OCCURS | INITIAL TEMPERATURE | CONDITIONS FOR START OF DETERMINATION |
|---|---|---|---|
| 1 | NO ABNORMALITY | Ta1 > Tb1 | CONVERGENCE OF SPEED DIFFERENCE |
| 2 | | Ta1 < Tb1 | CONVERGENCE OF SPEED DIFFERENCE |
| 3 | | Ta1 = Tb1 | CONVERGENCE OF SPEED DIFFERENCE |
| 4 | SECOND TEMPERATURE SENSOR HAS DOWNWARD OFFSET ABNORMALITY | Ta1 > Tb1 | CONVERGENCE OF SPEED DIFFERENCE |
| 5 | | Ta1 < Tb1 | ELAPSE OF SOAK TIME |
| 6 | | Ta1 = Tb1 | CONVERGENCE OF SPEED DIFFERENCE |
| 7 | SECOND TEMPERATURE SENSOR HAS UPWARD OFFSET ABNORMALITY | Ta1 > Tb1 | ELAPSE OF SOAK TIME |
| 8 | | Ta1 < Tb1 | CONVERGENCE OF SPEED DIFFERENCE |
| 9 | | Ta1 = Tb1 | CONVERGENCE OF SPEED DIFFERENCE |

[DIAGNOSIS CASE 3]

[DIAGNOSIS CASE 4]

[DIAGNOSIS CASE 6]

[DIAGNOSIS CASE 8]

[DIAGNOSIS CASE 9]

SENSOR DIAGNOSTIC DEVICE

CROSS-REFERENCE TO RELATED APPLICATIONS

The present application claims priority from Japanese Patent Application No. 2022-032025 filed on Mar. 2, 2022, the entire contents of which are hereby incorporated by reference.

BACKGROUND

The disclosure relates to a sensor diagnostic device including a first temperature sensor and a second temperature sensor for use in a vehicle.

Multiple temperature sensors are installed in a vehicle, such as a motor vehicle, to detect the temperature of each member for use in various types of control. Examples of the temperature sensor installed in the vehicle include a temperature sensor detecting a temperature of a coolant of an engine, a temperature sensor detecting a temperature of a hydraulic oil of a transmission, and a temperature sensor detecting the cell temperature of a battery. Meanwhile, each temperature sensor is desired to operate appropriately for proper control over the vehicle including temperature sensors. To meet the desire, the development of a diagnostic device configured to determine whether a temperature sensor has an abnormality by executing a so-called soak diagnosis or the like on a temperature sensor is underway (refer to Japanese Unexamined Patent Application Publication (JP-A) Nos. 2013-19484, 2013-108404, and 2010-96023).

SUMMARY

An aspect of the disclosure provides a sensor diagnostic device for use in a vehicle including a first temperature sensor and a second temperature sensor. The sensor diagnostic device is configured to detect a sensor abnormality of one or both of the first temperature sensor and the second temperature sensor. The sensor diagnostic device includes a control system. The control system includes a processor and a memory that are communicably coupled to each other. The control system is configured to determine whether a sensor abnormality has occurred based on a detected temperature difference between a first detected temperature detected by the first temperature sensor and a second detected temperature detected by the second temperature sensor. The control system is configured to, after the vehicle is stopped: calculate a decrease speed of the first detected temperature based on the first detected temperature, and calculate a decrease speed of the second detected temperature based on the second detected temperature; and in a case where an absolute value of a decrease speed difference between the first detected temperature and the second detected temperature is smaller than a threshold, determine whether the sensor abnormality has occurred, based on the detected temperature difference.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to describe the principles of the disclosure.

FIG. 9 illustrates conditions for diagnosis cases 1 to 9.

DETAILED DESCRIPTION

When a soak diagnosis is executed on each temperature sensor, detected temperatures of temperature sensors are compared with one another in a state of making temperatures of detection targets detected by the temperature sensors equal. That is, to execute the soak diagnosis, it is necessary to wait for predetermined soak time to pass after a vehicle is stopped. However, it takes a long time such as a few hours as soak time to make the temperatures of the detection targets equal. This results in difficulty in early determining whether a sensor abnormality has occurred.

It is desirable to early determine whether a sensor abnormality has occurred.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

[Vehicle Configurations]

Figure 1:
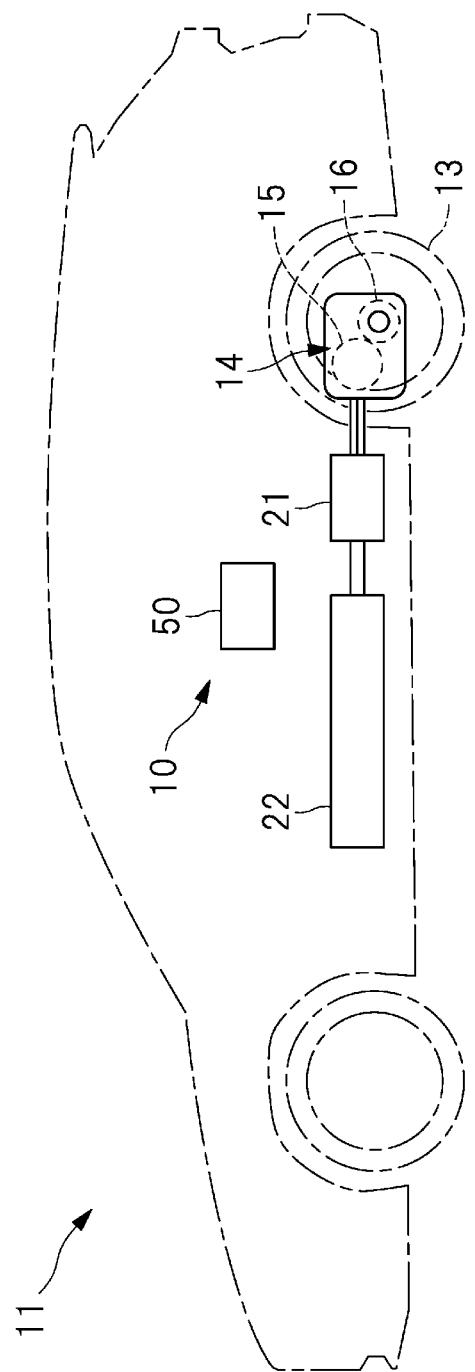
FIG. 1 illustrates an example of an electric vehicle employing a sensor diagnostic device according to one embodiment of the disclosure.
Figure 2:
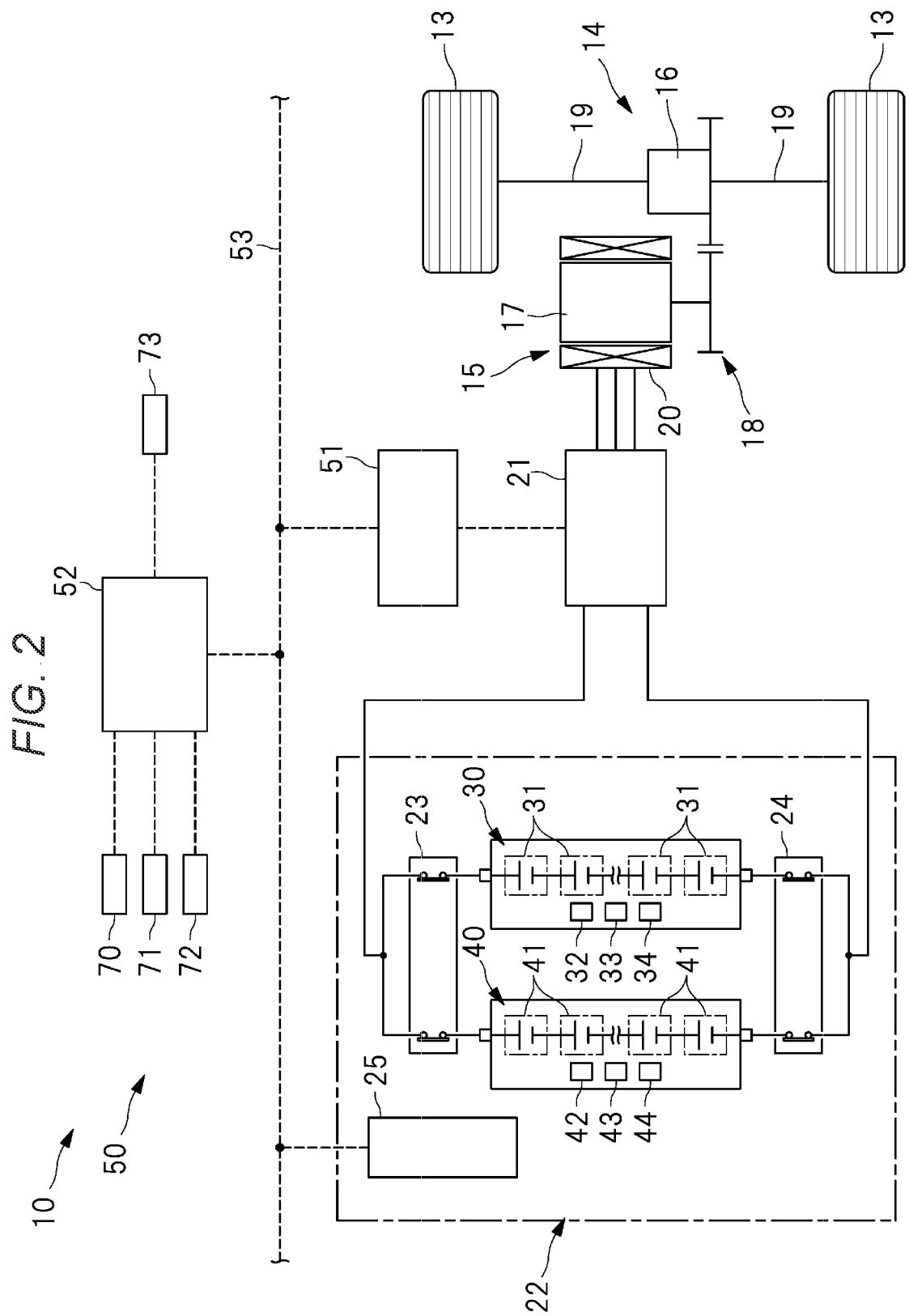
FIG. 2 illustrates an example of a control system constituting the sensor diagnostic device.

FIG. 1 illustrates an example of an electric vehicle 11 employing a sensor diagnostic device 10 according to one embodiment of the disclosure. In one embodiment, the electric vehicle 11 may serve as a "vehicle". FIG. 2 illustrates an example of a control system 50 constituting the sensor diagnostic device 10. The control system 50 illustrated in FIG. 2 serves as not only the control system 50 for the sensor diagnostic device 10 but also the control system 50 for the electric vehicle 11. As illustrated in FIGS. 1 and 2, the electric vehicle 11 is provided with an electric axle 14 driving a wheel 13. The electric axle 14 has a motor-generator 15 and a differential mechanism 16. The differential mechanism 16 is coupled to a rotor 17 of the motor-generator 15 via a gear train 18. The wheel 13 is coupled to an axle shaft 19 extending from the differential mechanism 16.

An inverter 21 is coupled to a stator 20 of the motor-generator 15 and a battery pack 22 is coupled to the inverter 21. The battery pack 22 is provided with two battery modules 30, 40 in parallel connection, and the battery modules 30, 40 are provided with multiple battery cells 31, 41 in series connection, respectively. The battery pack 22 is also provided with main relays 23, 24 coupled to the battery modules 30, 40 and a battery control unit 25 monitoring charge/discharge of the battery modules 30, 40.

Furthermore, the battery pack 22 is provided with current sensors 32, 42 detecting charge/discharge currents of the battery modules 30, 40, voltage sensors 33, 43 detecting voltages of the battery modules 30, 40, and temperature sensors 34, 44 detecting temperatures of the battery modules 30, 40. That is, the battery pack 22 is provided with the first temperature sensor 34 detecting the temperature of the battery module 30 and the second temperature sensor 44 detecting the temperature of the battery module 40. In this way, the electric vehicle 11 is provided with the first temperature sensor 34 detecting the temperature of the battery module 30 and the second temperature sensor 44 detecting the temperature of the battery module 40.

[Control System]

As illustrated in FIG. 2, the electric vehicle 11 is provided with the control system 50 configured with multiple electronic control units to execute sensor diagnostic control, to be described later, and control the electric axle 14, the battery pack 22, and the like. The electronic control units constituting the control system 50 include the battery control unit 25 described above and a motor control unit 51 controlling the inverter 21. The electronic control units constituting the control system 50 also include a vehicle control unit 52 outputting control signals to the control units 25, 51. These control units 25, 51, 52 are communicably coupled to one another via an in-vehicle network 53 such as a Controller Area Network (CAN).

Figure 3:
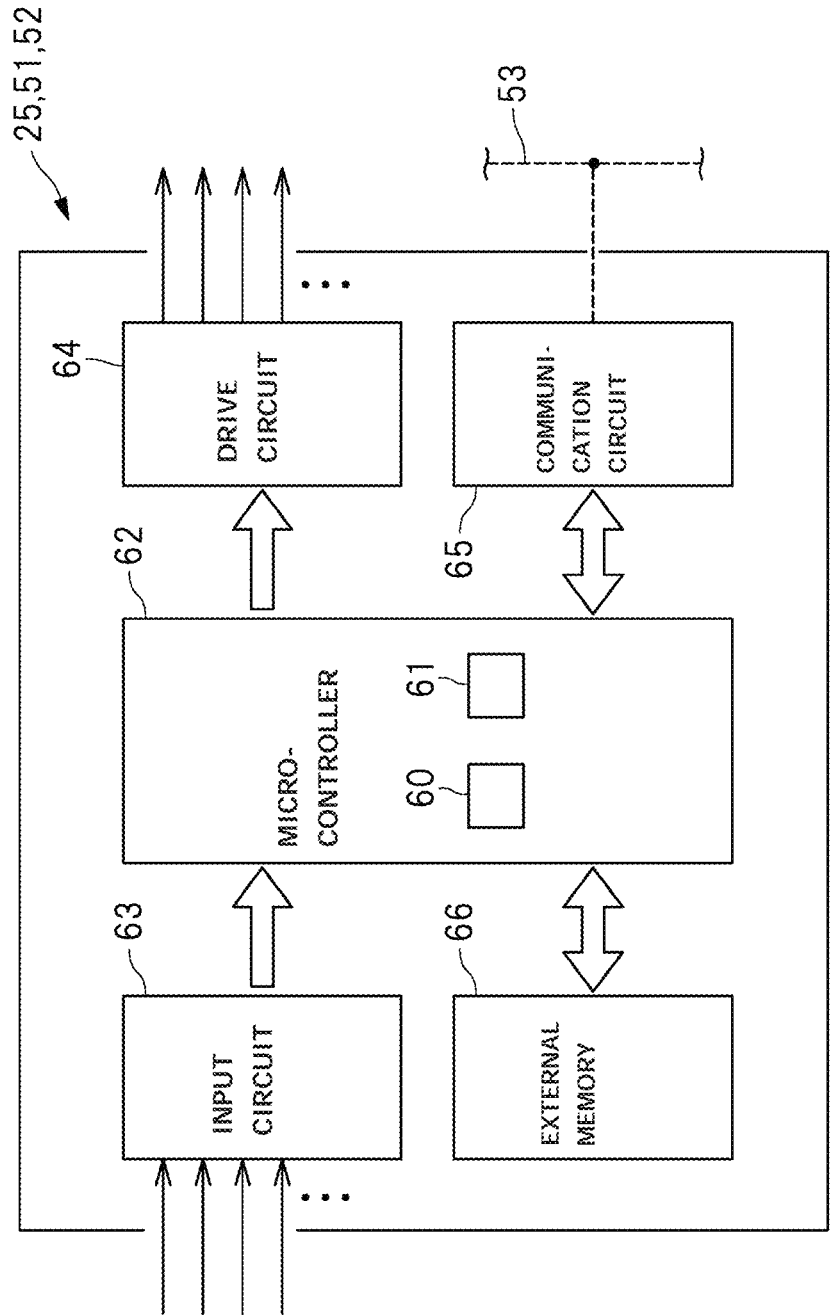
FIG. 3 illustrates an example of a basic structure of each control unit.

FIG. 3 illustrates an example of a basic structure of each of the control units 25, 51, 52. As illustrated in FIG. 3, each of the control units 25, 51, 52 has a microcontroller 62 into which a processor 60, a main memory 61, and the like are incorporated. In one embodiment, the main memory 61 may serve as a "memory". Predetermined programs are stored in the main memory 61 and executed by the processor 60. The processor 60 and the main memory 61 are communicably coupled to each other. It is noted that multiple processors 60 may be incorporated into the microcontroller 62, or multiple main memories 61 may be incorporated into the microcontroller 62.

Furthermore, each of the control units 25, 51, 52 has an input circuit 63, a drive circuit 64, a communication circuit 65, an external memory 66, and the like. The input circuit 63 converts signals input from various sensors into signals that can be input to the microcontroller 62. The drive circuit 64 generates drive signals to drive various devices such as the electric axle 14 described above, based on the signals output from the microcontroller 62. The communication circuit 65 converts the signals output from the microcontroller 62 into communication signals destined for the other control units. In addition, the communication circuit 65 converts communication signals received from the other control units into signals that can be input to the microcontroller 62. Furthermore, programs, various data, and the like are stored in the external memory 66 configured with a nonvolatile memory and the like.

The vehicle control unit 52 sets an operating target such as the electric axle 14 based on information input from the control units 25, 51 and the various sensors to be described later. The vehicle control unit 52 generates a control signal in response to the operating target such as the electric axle 14 and outputs the control signal to each control unit 25, 51. Examples of the sensors coupled to the vehicle control unit 52 include a vehicle speed sensor 70 detecting a vehicle speed of the electric vehicle 11, an accelerator sensor 71 detecting an operation amount of an accelerator pedal, and a brake sensor 72 detecting an operation amount of a brake pedal. Furthermore, a start-up switch 73 operated by a driver who drives the electric vehicle 11 at a time of starting the control system 50 is coupled to the vehicle control unit 52. The start-up switch 73 is also called the "ignition switch".

Types of control modes of the control system 50 include an OFF mode for setting the electric vehicle 11 into a start-up disabled state of disabling running of the electric vehicle 11 and an ON mode for setting the electric vehicle 11 into a start-up state of enabling the running of the electric vehicle 11. During switchover of the control system 50, for example, from the OFF mode to the ON mode, in a state of actuating a parking brake, not illustrated, the driver holds down the brake pedal and presses the start-up switch 73. The control system 50 is thereby switched from the OFF mode to the ON mode. In addition, during the switchover of the control system 50 from the ON mode to the OFF mode, the driver actuates the parking brake while holding down the brake pedal and presses the start-up switch 73. The control system 50 is thereby switched from the ON mode to the OFF mode.

As described above, the battery pack 22 is provided with the first temperature sensor 34 detecting the temperature of the battery module 30 and the second temperature sensor 44 detecting the temperature of the battery module 40. The first temperature sensor 34 and the second temperature sensor 44 are desired to operate appropriately for proper control over the electric vehicle 11 including this battery pack 22. To meet the desire, the battery control unit 25 constituting the control system 50 executes sensor diagnostic control (which will be described later) to determine whether an abnormality has occurred in the first temperature sensor 34 or the second temperature sensor 44. As described later, the sensor diagnostic control continues even after switching the control system 50 to the OFF mode. Therefore, even when the control system 50 is switched to the OFF mode, the battery control unit 25 and the like are kept in a start-up state.

[Sensor Diagnostic Control]

Figure 4:
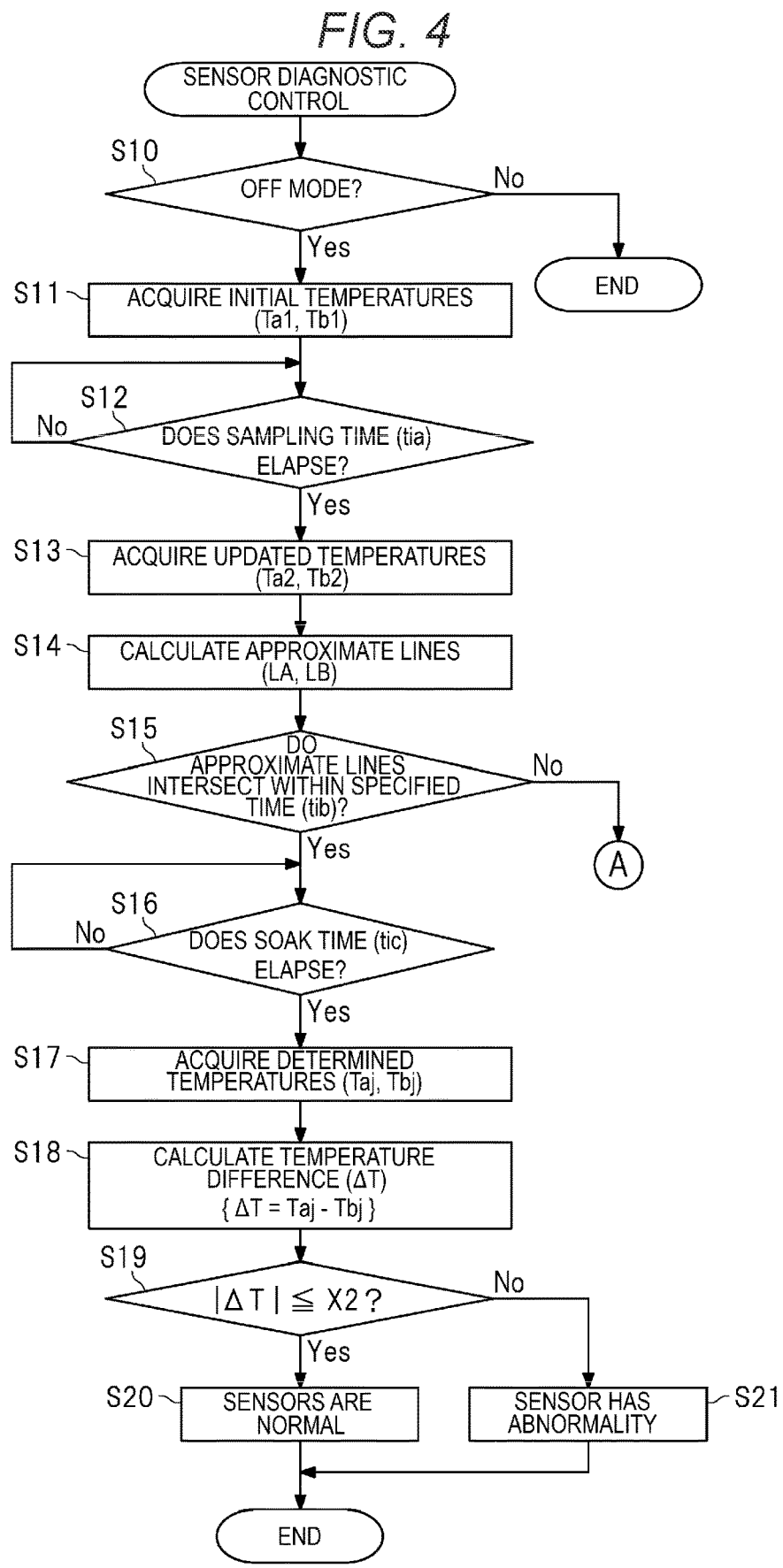
FIG. 4 is a flowchart illustrating an example of procedures for executing sensor diagnostic control by the control system.
Figure 5:
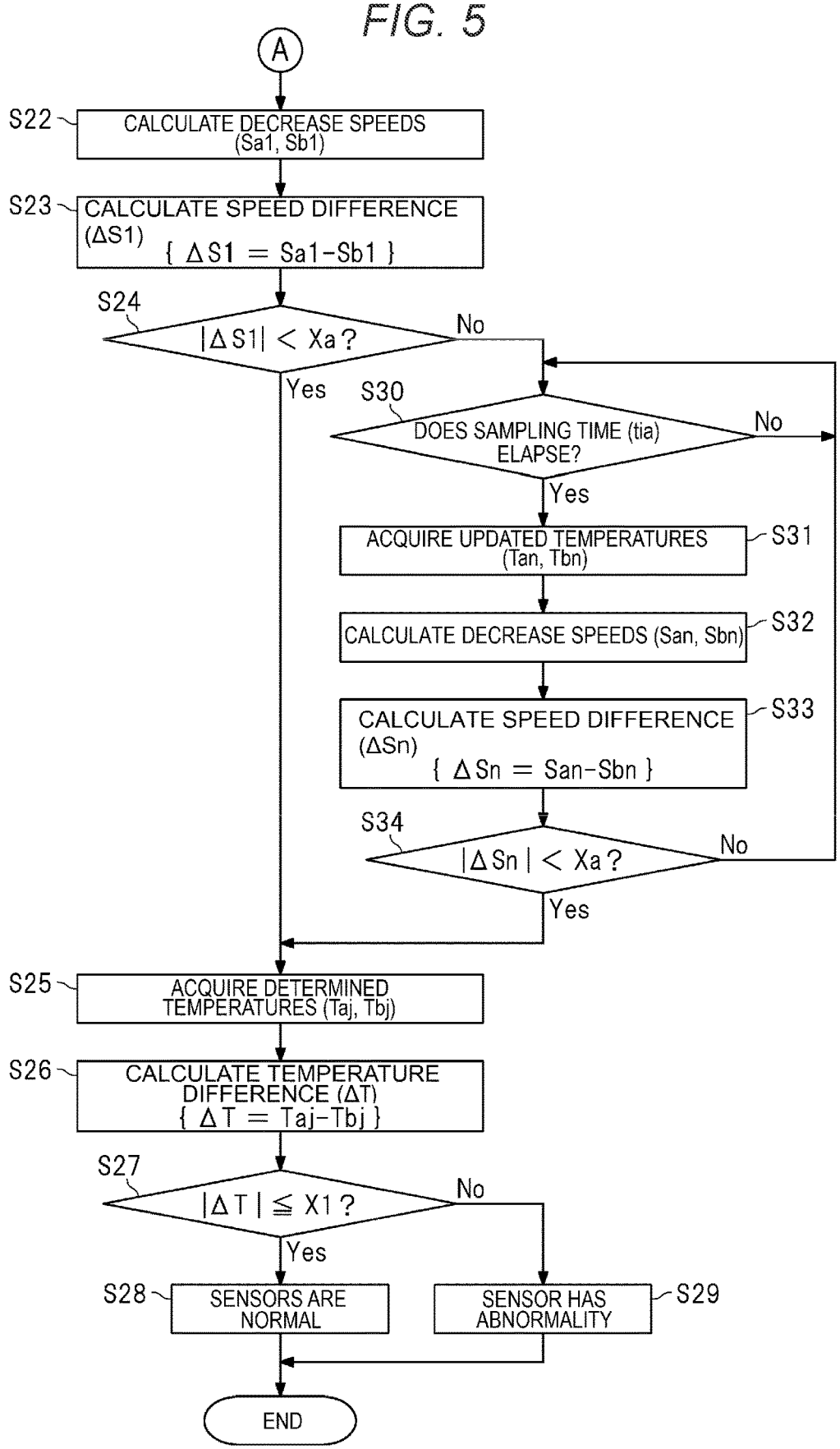
FIG. 5 is a flowchart illustrating an example of procedures for executing the sensor diagnostic control by the control system.

Sensor diagnostic control executed by the control system 50 will be described below. FIGS. 4 and 5 are flowcharts illustrating an example of procedures for executing the sensor diagnostic control by the control system 50. The flowcharts illustrated in FIGS. 4 and 5 are coupled at parts of sign A. In addition, each step illustrated in the flowcharts of FIGS. 4 and 5 indicates processing executed by one or multiple processors 60 constituting the control system 50. The sensor diagnostic control illustrated in FIGS. 4 and 5 is executed by the control system 50 in every predetermined cycle after the control system 50 is started in the ON mode.

<Start Timing of Determination Based on Soak Time>

As illustrated in FIG. 4, in Step S10, it is determined whether the control mode is switched from the ON mode to the OFF mode, i.e., whether the electric vehicle 11 is controlled into the start-up disabled state of disabling running of the electric vehicle 11. When it is determined that the control mode is the ON mode in Step S10, charge/discharge of the battery pack 22 continues. Therefore, a routine is exited without a start of determination as to whether an abnormality has occurred in the first temperature sensor 34 and the second temperature sensor 44. On the other hand, when it is determined that the control mode is the OFF mode, i.e., it is determined that the electric vehicle 11 is stopped in Step S10, the charge/discharge of the battery pack 22 is stopped. Therefore, the process goes to Step S11. In Step S11, it is determined whether an abnormality has occurred in the first temperature sensor 34 and the second temperature sensor 44.

In Step S11, the battery control unit 25 acquires an initial temperature Ta1 of the battery module 30 detected by the first temperature sensor 34, i.e., the initial temperature Ta1 at the timing of switching the control mode from the ON mode to the OFF mode. Likewise, in Step S11, the battery control unit 25 acquires an initial temperature Tb1 of the battery module 40 detected by the second temperature sensor 44, i.e., the initial temperature Tb1 at the timing of switching the control mode from the ON mode to the OFF mode. In subsequent Step S12, it is determined whether predetermined sampling time tia (for example, a few tens of minutes) elapses. When it is determined that the sampling time tia elapses in Step S12, the process goes to Step S13. In Step S13, the battery control unit 25 acquires an updated temperature Ta2 of the battery module 30 detected by the first temperature sensor 34 and an updated temperature Tb2 of the battery module 40 detected by the second temperature sensor 44.

In subsequent Step S14, the battery control unit 25 calculates an approximate line LA indicating a transition of a first detected temperature (hereinafter, referred to as "sensor temperature TA") of the first temperature sensor 34 based on the initial temperature Ta1 and the updated temperature Ta2. Likewise, in subsequent Step S14, the battery control unit 25 calculates an approximate line LB indicating a transition of a second detected temperature (hereinafter, referred to as "sensor temperature TB") of the second temperature sensor 44 based on the initial temperature Tb1 and the updated temperature Tb2. In subsequent Step S15, it is predicted whether the approximate lines LA and LB will intersect each other before elapse of predetermined, specified time tib since the control mode is switched to the OFF mode. That is, it is predicted whether a magnitude relation between the sensor temperatures TA, TB will be reversed before elapse of the predetermined, specified time tib since the control mode is switched to the OFF mode.

When it is predicted that the approximate lines LA, LB will intersect each other within the specified time tib in Step S15, the process goes to Step S16. In Step S16, it is determined whether predetermined soak time tic (for example, a few hours) has elapsed since the control mode is switched to the OFF mode. The soak time tic is set longer than the specified time tib. In one embodiment, the soak time tic may be referred to as an "uncontrolled time". When it is determined that the soak time tic elapses in Step S16, the process goes to Step S17. In Step S17, the battery control unit 25 acquires determined temperatures Taj, Tbj of the battery modules 30, 40. That is, in Step S17, the battery control unit 25 acquires the determination temperature Taj of the battery module 30 detected by the first temperature sensor 34, i.e., the sensor temperature TA at the timing of elapse of the soak time tic. Likewise, in Step S17, the battery control unit 25 acquires the determination temperature Tbj of the battery module 40 detected by the second temperature sensor 44, i.e., the sensor temperature TB at the timing of elapse of the soak time tic.

Next, in Step S18, a detected temperature difference ΔT that is a difference between the determination temperatures Taj and Tbj is calculated. In subsequent Step S19, it is determined whether an absolute value of the detected temperature difference ΔT is equal to or smaller than a predetermined temperature difference threshold X2. In one embodiment, the predetermined temperature difference threshold X2 may be referred to as a "second temperature difference threshold". When it is determined that the absolute value of the detected temperature difference ΔT is equal to or smaller than the temperature difference threshold X2 in Step S19, the process goes to Step S20. In Step S20, it is determined that the first temperature sensor 34 and the second temperature sensor 44 are normal. On the other hand, when it is determined that the absolute value of the detected temperature difference ΔT is greater than the temperature difference threshold X2 in Step S19, the process goes to Step S21. In Step S21, it is determined that the first temperature sensor 34 or the second temperature sensor 44 has an abnormality.

That is, when the soak time tic elapses, the battery modules 30, 40 are in a state of converging into a substantially equal temperature. Therefore, when both the first temperature sensor 34 and the second temperature sensor 44 are normal, the sensor temperatures TA, TB are closer to each other. Owing to this, when it is determined that the absolute value of the detected temperature difference ΔT is equal to or smaller than the temperature difference threshold X2, the process goes to Step S20. In Step S20, it is determined that the first temperature sensor 34 and the second temperature sensor 44 are normal. On the other hand, when it is determined that the absolute value of the detected temperature difference ΔT is greater than the temperature difference threshold X2, the process goes to Step S21. In Step S21, it is determined that the first temperature sensor 34 or the second temperature sensor 44 deviates from a normal value, i.e., has an offset abnormality. Alternatively, in Step S21, the temperature sensor having the offset abnormality may be identified by comparing, for example, an external temperature detected by an external temperature sensor, not illustrated, with the sensor temperatures TA, TB detected by the first and second temperature sensors 34, 44.

Figure 6:
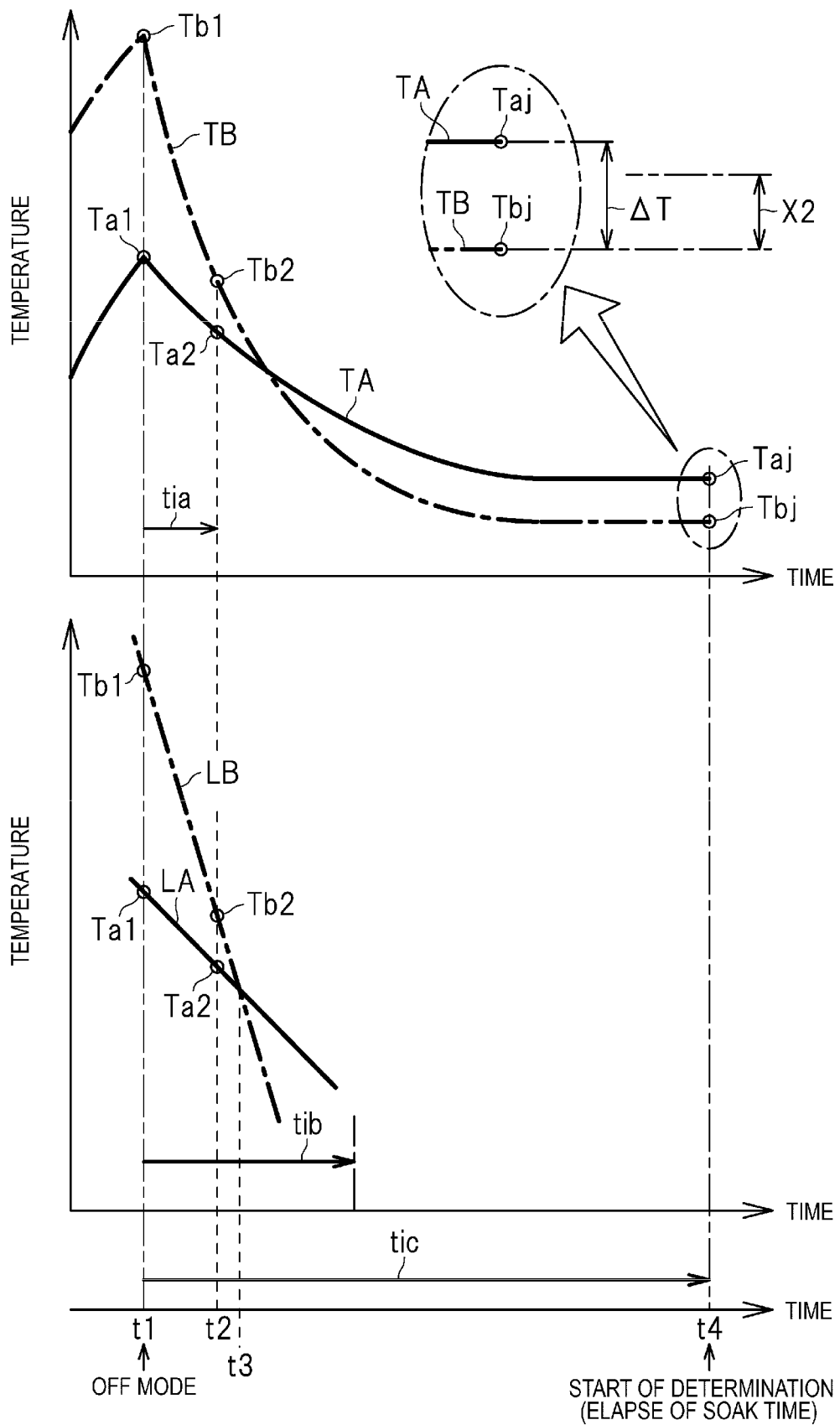
FIG. 6 illustrates an example of transitions of sensor temperatures in the sensor diagnostic control.

FIG. 6 illustrates an example of the transitions of the sensor temperatures TA, TB in the sensor diagnostic control. As indicated at a time t1 in FIG. 6, when the control mode is switched to the OFF mode, initial temperatures Ta1, Tb1 of sensor temperatures TA, TB are detected. Next, as indicated at a time t2, when the sampling time tia elapses, the updated temperatures Ta2, Tb2 of the sensor temperatures TA, TB are detected. Subsequently, the approximate line LA indicating a transition of the sensor temperature TA is obtained by connecting the initial temperature Ta1 to the updated temperature Ta2 by a line. The approximate line LB indicating a transition of the sensor temperature TB is obtained by connecting the initial temperature Tb1 to the updated temperature Tb2 by a line. It is then predicted whether the approximate lines LA, LB will intersect each other within the specified time tib.

In the example illustrated in FIG. 6, it is predicted that the approximate lines LA, LB will intersect each other at a time t3 within the specified time tib. Therefore, a determination as to whether a sensor abnormality has occurred is started after waiting for the passage of the soak time tic. That is, as indicated at a time t4 in FIG. 6, when the soak time tic elapses, the determination temperatures Taj, Tbj of the sensor temperatures TA, TB are detected. It is then determined that the first temperature sensor 34 or the second temperature sensor 44 has a sensor abnormality based on the absolute value of the detected temperature difference $\Delta T$. That is, when the absolute value of the detected temperature difference $\Delta T$ is greater than the temperature difference threshold X2, it is determined that the first temperature sensor 34 or the second temperature sensor 44 deviates from a normal value, i.e., has an offset abnormality. On the other hand, when it is determined that the absolute value of the detected temperature difference $\Delta T$ is smaller than the temperature difference threshold X2, it is determined that the first temperature sensor 34 and the second temperature sensor 44 are normal. In the example illustrated in FIG. 6, it is determined that the absolute value of the detected temperature difference $\Delta T$ is greater than the temperature difference threshold X2 as indicated by an enlarged part. It is, therefore, determined that the first temperature sensor 34 or the second temperature sensor 44 has the offset abnormality.

<Start Timing of Determination Based on Decrease Speed Difference Between Sensor Temperatures>

As illustrated in FIG. 4, when it is predicted that the approximate lines LA, LB will not intersect within the specified time tib in Step S15, the start timing of the determination as to the sensor abnormality is determined using decrease speeds of the sensor temperatures TA, TB. The process, therefore, goes to Step S22 in FIG. 5 from Step S15. As illustrated in FIG. 5, in Step S22, the battery control unit 25 calculates a decrease speed Sa1 of the sensor temperature TA based on the initial temperature Ta1, the updated temperature Ta2, and the sampling time tia. Likewise, in Step S22, the battery control unit 25 calculates a decrease speed Sb1 of the sensor temperature TB based on the initial temperature Tb1, the updated temperature Tb2, and the sampling time tia. That is, in Step S22, the battery control unit 25 calculates the decrease speed Sa1 that is a variation of the sensor temperature TA per unit time and the decrease speed Sb1 that is a variation of the sensor temperature TB per unit time.

Next, the process goes to Step S23. In Step S23, a speed difference $\Delta S1$ that is a difference between the decrease speed Sa1 and the decrease speed Sb1 is calculated. In one embodiment, the speed difference $\Delta S1$ may be referred to as a "decrease speed difference". In subsequent Step S24, it is determined whether an absolute value of the speed difference $\Delta S1$ is smaller than a predetermined threshold Xa. When it is determined that the absolute value of the speed difference $\Delta S1$ is smaller than the threshold Xa in Step S24, the process goes to Step S25. In Step S25, the battery control unit 25 acquires the determination temperatures Taj, Tbj of the battery modules 30, 40. That is, a situation in which the speed difference $\Delta S1$ between the decrease speed Sa1 of the sensor temperature TA and the decrease speed Sb1 of the sensor temperature TB is smaller than the threshold Xa is one in which the decrease speeds Sa1, Sb1 of the sensor temperatures TA, TB declining together over time are close to each other. In this case, the process goes to Step S25. To determine whether the sensor abnormality has occurred without waiting for the soak time tic, the battery control unit 25 acquires the determination temperatures Taj, Tbj of the battery modules 30, 40.

Next, in Step S26, the detected temperature difference $\Delta T$ that is the difference between the determination temperature Taj and the determination temperature Tbj is calculated. In subsequent Step S27, it is determined whether the absolute value of the detected temperature difference $\Delta T$ is equal to or smaller than a predetermined temperature difference threshold X1. In one embodiment, the predetermined temperature difference threshold X1 may be referred to as a "first temperature difference threshold". The temperature difference threshold X2 used in Step S19 described previously is smaller than the temperature difference threshold X1 used in Step S27. When it is determined that the absolute value of the detected temperature difference $\Delta T$ is equal to or smaller than the temperature difference threshold X1 in Step S27, the process goes to Step S28. In Step S28, it is determined that the first temperature sensor 34 and the second temperature sensor 44 are normal. On the other hand, when it is determined that the absolute value of the detected temperature difference $\Delta T$ is greater than the temperature difference threshold X1 in Step S27, the process goes to Step S29. In Step S29, it is determined that the first temperature sensor 34 or the second temperature sensor 44 has an abnormality.

Meanwhile, when it is determined that the absolute value of the speed difference $\Delta S1$ is equal to or greater than the threshold Xa in Step S24, the process goes to Step S30. In Step S30, it is determined whether the predetermined sampling time tia elapses. When it is determined that the sampling time tia elapses in Step S30, the process goes to Step S31. In Step S31, the battery control unit 25 acquires an updated temperature Tan of the battery module 30 detected by the first temperature sensor 34 and an updated temperature Tbn of the battery module 40 detected by the second temperature sensor 44.

In subsequent Step S32, the battery control unit 25 calculates a decrease speed San of the sensor temperature TA based on the previous updated temperature Ta2, the current updated temperature Tan, and the sampling time tia. Likewise, in subsequent Step S32, the battery control unit 25 calculates a decrease speed Sbn of the sensor temperature TB based on the previous updated temperature Tb2, the current updated temperature Tbn, and the sampling time tia. That is, in Step S32, the decrease speed San that is a variation of the sensor temperature TA per unit time is updated, and the decrease speed Sbn that is a variation of the sensor temperature TB per unit time is updated.

Next, the process goes to Step S33. In step S33, a speed difference $\Delta Sn$ that is a difference between the decrease speed San and the decrease speed Sbn is calculated. In one embodiment, the speed difference $\Delta Sn$ may serve as a "decrease speed difference". In subsequent Step S34, it is determined whether an absolute value of the speed difference $\Delta Sn$ is smaller than the predetermined threshold Xa. When it is determined that the absolute value of the speed difference $\Delta Sn$ is smaller than the threshold Xa in Step S34, the process goes to Step S25. In Step S25, the battery control unit 25 acquires the determination temperatures Taj, Tbj of the battery modules 30, 40. As described above, when it is determined that the absolute value of the detected temperature difference ΔT is equal to or smaller than the temperature difference threshold X1 in Step S27, the process goes to Step S28. In Step S28, it is determined that the first temperature sensor 34 and the second temperature sensor 44 are normal. On the other hand, when it is determined that the absolute value of the detected temperature difference ΔT is greater than the temperature difference threshold X1 in Step S27, the process goes to Step S29. In Step S29, it is determined that the first temperature sensor 34 or the second temperature sensor 44 has an offset abnormality. When it is determined that the absolute value of the speed difference ΔSn is equal to or greater than the threshold Xa in Step S34, the updated temperatures Tan, Tbn, the decrease speeds San, Sbn, and the speed difference ΔSn are updated whenever the sampling time tia elapses in Steps S30 to S33.

Figure 7:
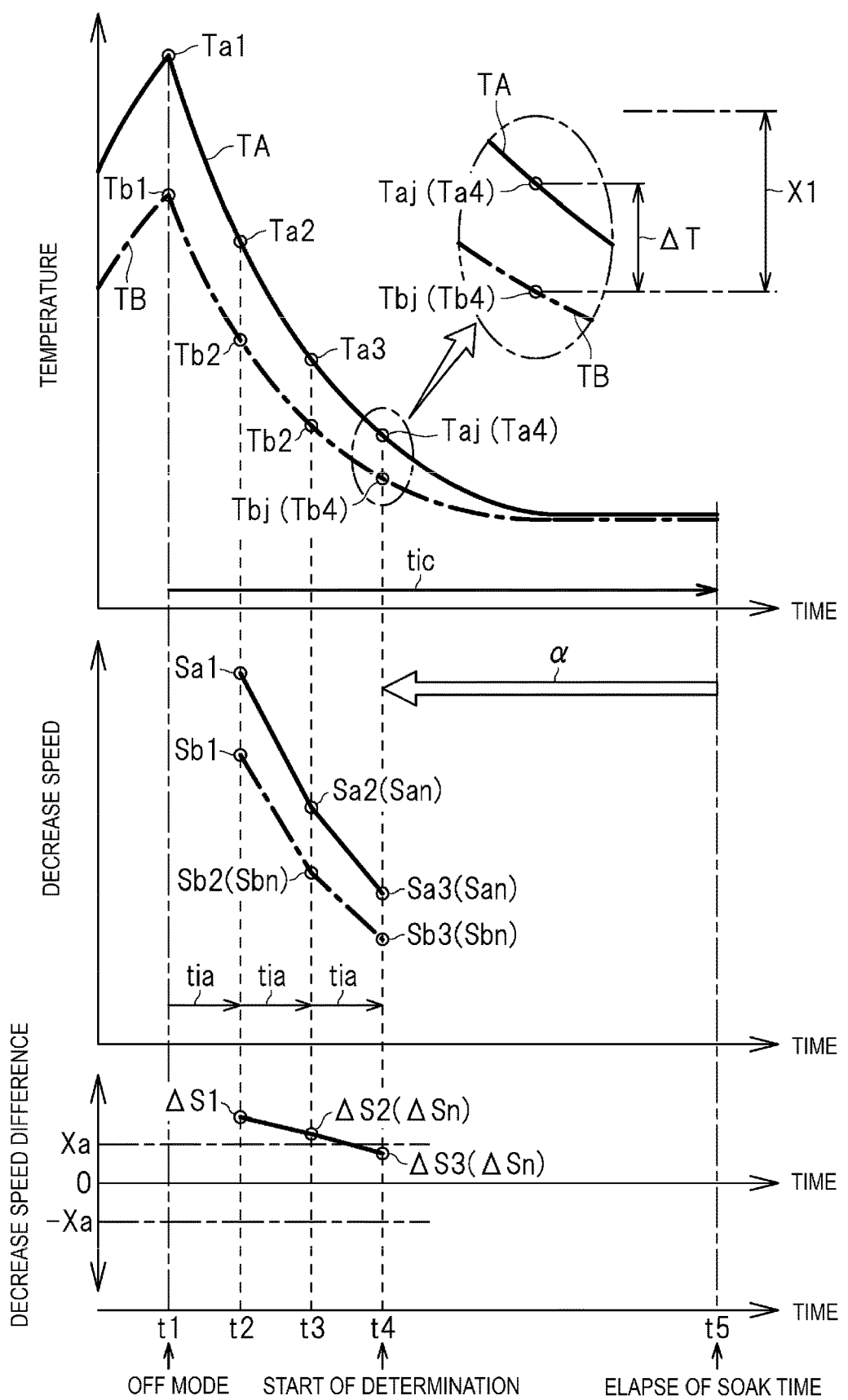
FIG. 7 illustrates an example of transitions of the sensor temperatures in the sensor diagnostic control.
Figure 8:
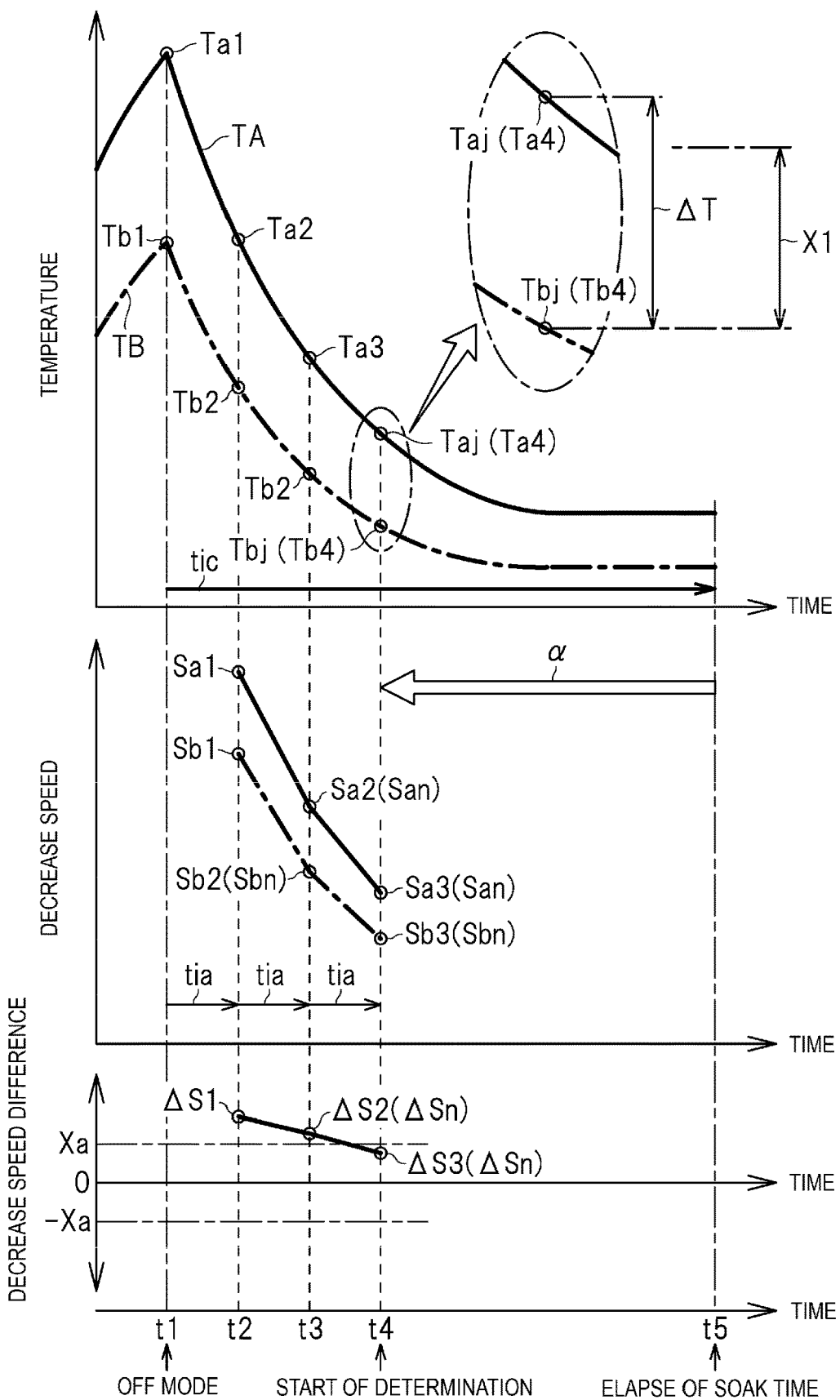
FIG. 8 illustrates an example of transitions of the sensor temperatures in the sensor diagnostic control.

FIGS. 7 and 8 illustrates examples of the transition of the sensor temperatures TA, TB in the sensor diagnostic control. It is noted that FIG. 7 illustrates a situation in which no offset abnormality occurs, while FIG. 8 illustrates a situation in which an offset abnormality occurs.

As indicated at the time t1 in FIG. 7, when the control mode is switched to the OFF mode, the initial temperatures Ta1, Tb1 of the sensor temperatures TA, TB are detected. Next, as indicated at a time t2, when the sampling time tia elapses, the updated temperatures Ta2, Tb2 of the sensor temperatures TA, TB are detected. The decrease speed Sa1 of the sensor temperature TA is calculated based on the initial temperature Ta1 and the updated temperature Ta2, and the decrease speed Sb1 of the sensor temperature TB is calculated based on the initial temperature Tb1 and the updated temperature Tb2. In addition, the speed difference ΔS1 between the decrease speeds Sa1, Sb1 of the sensor temperatures TA, TB is calculated based on the decrease speeds Sa1, Sb1. In the example illustrated in FIG. 7, the speed difference ΔS1 is greater than the threshold Xa. Therefore, as indicated in times t3, t4, the decrease speeds San, Sbn and the speed difference ΔSn are updated whenever the predetermined sampling time tia elapses.

As indicated at the time t4 in FIG. 7, when a speed difference ΔS3 between decrease speeds Sa3, Sb3 is smaller than the threshold Xa, a determination as to whether an abnormality has occurred in the first temperature sensor 34 and the second temperature sensor 44 is started. That is, as indicated at the time t4 in FIG. 7, the determination temperatures Taj, Tbj of the sensor temperatures TA, TB are detected. When the absolute value of the detected temperature difference ΔT is greater than the temperature difference threshold X1, it is determined that the first temperature sensor 34 or the second temperature sensor 44 has an offset abnormality. On the other hand, when the absolute value of the detected temperature difference ΔT is smaller than the temperature difference threshold X1, it is determined that the first temperature sensor 34 and the second temperature sensor 44 are normal. In the example in FIG. 7, the absolute value of the detected temperature difference ΔT is smaller than the temperature difference threshold X1 as illustrated in an enlarged part. It is, therefore, determined that the first temperature sensor 34 and the second temperature sensor 44 are normal.

Furthermore, as indicated at the time t1 in FIG. 8, when the control mode is switched to the OFF mode, the initial temperatures Ta1, Tb1 of the sensor temperatures TA, TB are detected. Next, as indicated at a time t2, when the sampling time tia elapses, the updated temperatures Ta2, Tb2 of the sensor temperatures TA, TB are detected. The decrease speed Sa1 of the sensor temperature TA is calculated based on the initial temperature Ta1 and the updated temperature Ta2, and the decrease speed Sb1 of the sensor temperature TB is calculated based on the initial temperature Tb1 and the updated temperature Tb2. In addition, the speed difference ΔS1 between the decrease speeds Sa1, Sb1 of the sensor temperatures TA, TB is calculated based on the decrease speeds Sa1, Sb1. In the example illustrated in FIG. 8, the speed difference ΔS1 is greater the threshold Xa. Owing to this, as indicated at times t3, t4, the decrease speeds San, Sbn and the speed difference ΔSn are updated whenever the predetermined sampling time tia elapses.

As indicated at the time t4 in FIG. 8, when the speed difference ΔS3 between the decrease speeds Sa3, Sb3 is smaller than the threshold Xa, the determination as to whether an abnormality has occurred in the first temperature sensor 34 and the second temperature sensor 44 is started. That is, as indicated at the time t4 in FIG. 8, the determination temperatures Taj, Tbj of the sensor temperatures TA, TB are detected. When the absolute value of the detected temperature difference ΔT is greater than the temperature difference threshold X1, it is determined that the first temperature sensor 34 or the second temperature sensor 44 has an offset abnormality. On the other hand, when the absolute value of the detected temperature difference ΔT is smaller than the temperature difference threshold X1, it is determined that the first temperature sensor 34 and the second temperature sensor 44 are normal. In the example in FIG. 8, the absolute value of the detected temperature difference ΔT is greater than the temperature difference threshold X1 as illustrated in an enlarged part. Therefore, it is determined that the first temperature sensor 34 or the second temperature sensor 44 has an offset abnormality.

As described with reference to FIGS. 7 and 8, a situation in which the speed difference ΔSn between the decrease speeds San, Sbn is smaller than the threshold Xa is one in which the decrease speeds of the sensor temperatures TA, TB declining together over time are close to each other. That is, the situation is one in which the decrease speeds San, Sbn of the sensor temperatures TA, TB do not largely deviate and in which the detected temperature difference ΔT between the sensor temperatures TA, TB stably decreases without abrupt change. Owing to this, the determination as to whether an abnormality has occurred in the first temperature sensor 34 and the second temperature sensor 44 is started based on the detected temperature difference ΔT between the sensor temperatures TA, TB without waiting for elapse of the soak time tic described above. As indicated by an arrow a in FIGS. 7 and 8, it is thereby possible to greatly advance the start timing of the determination and early determine whether the sensor abnormality has occurred, compared with a case of waiting for the elapse of the soak time tic.

[Diagnosis Cases 1-9]

Figure 10:
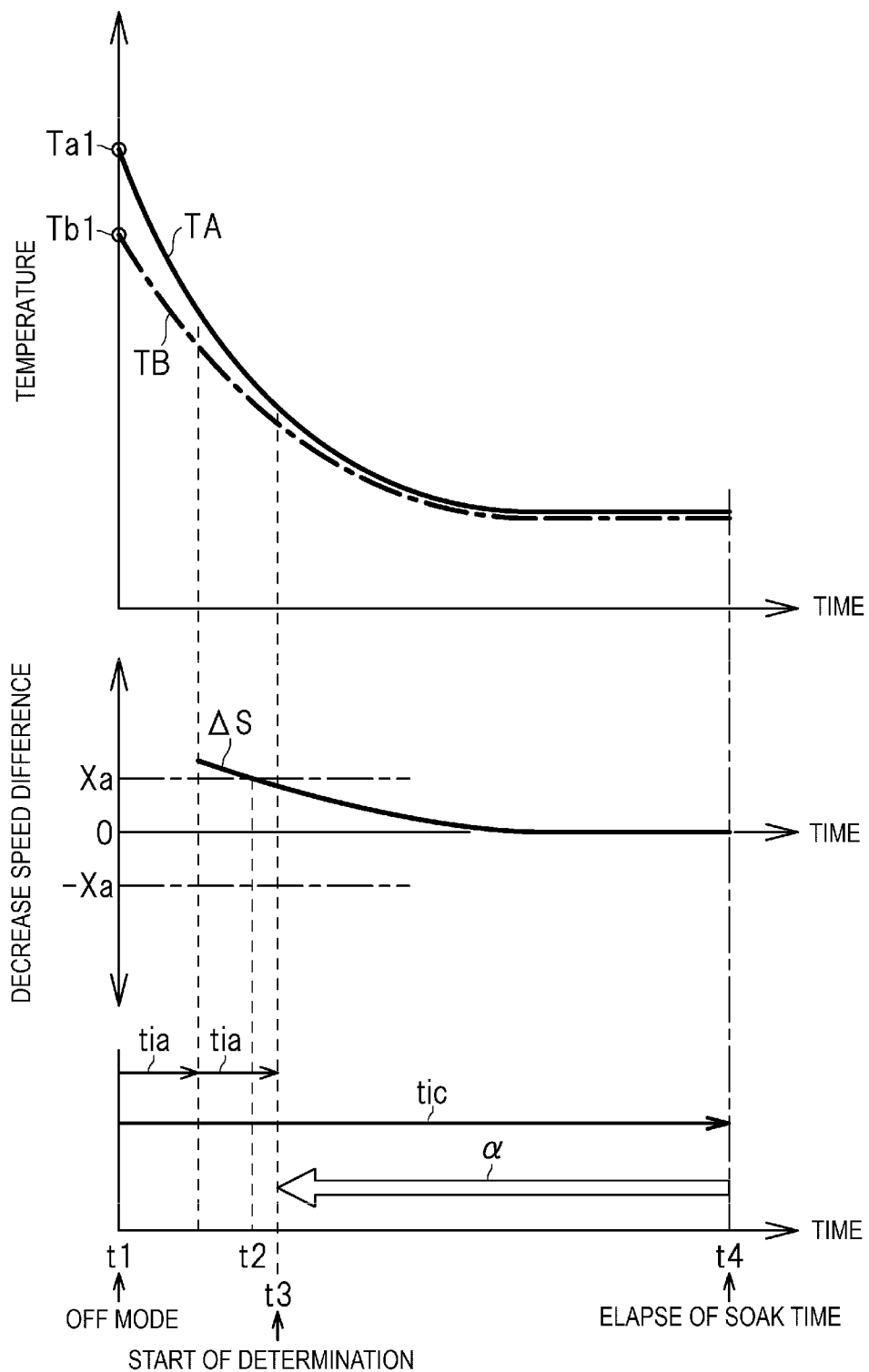
FIG. 10 illustrates transitions of the sensor temperatures in the diagnosis case 1.
Figure 11:
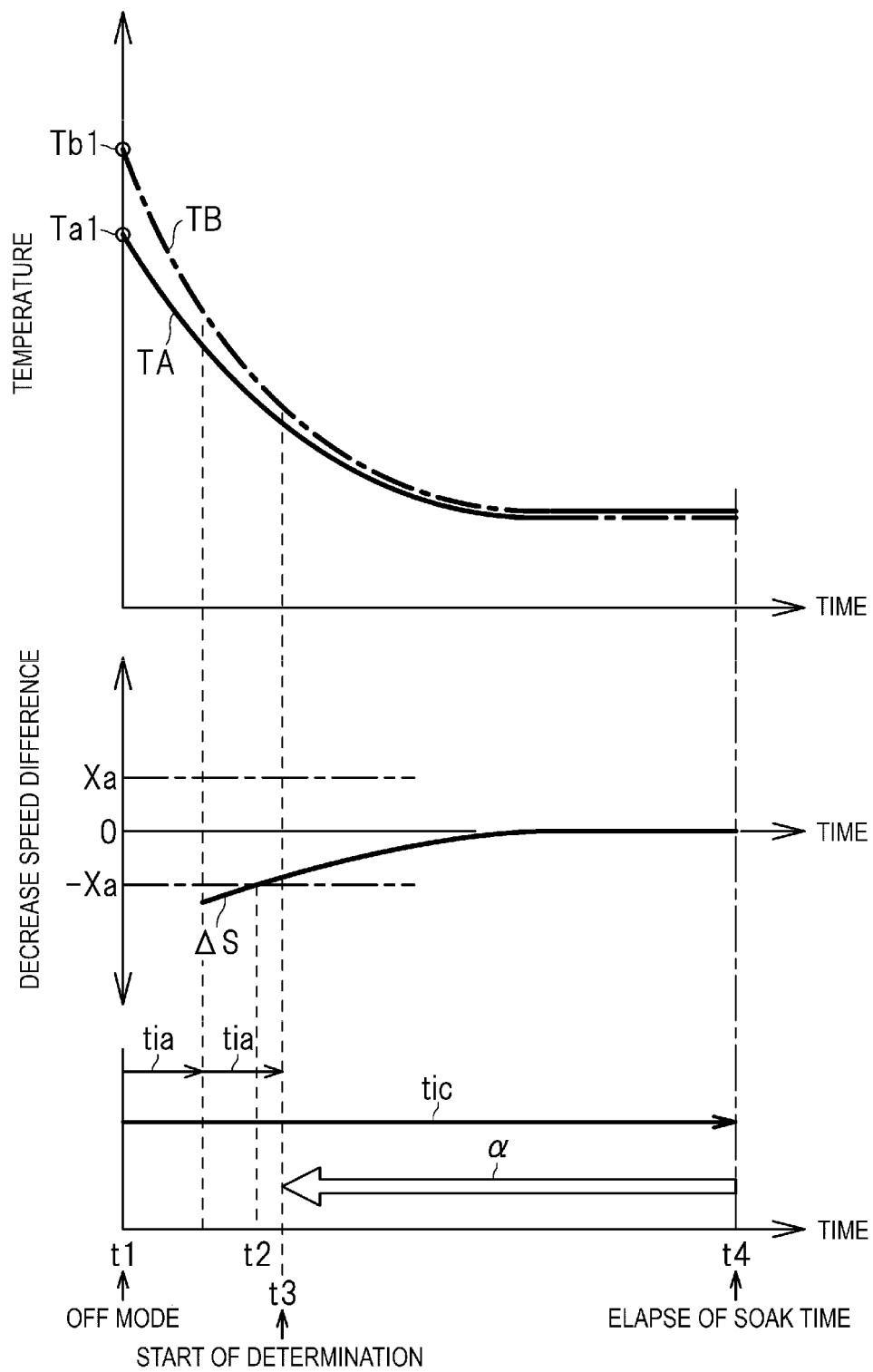
FIG. 11 illustrates transitions of the sensor temperatures in the diagnosis case 2.
Figure 12:
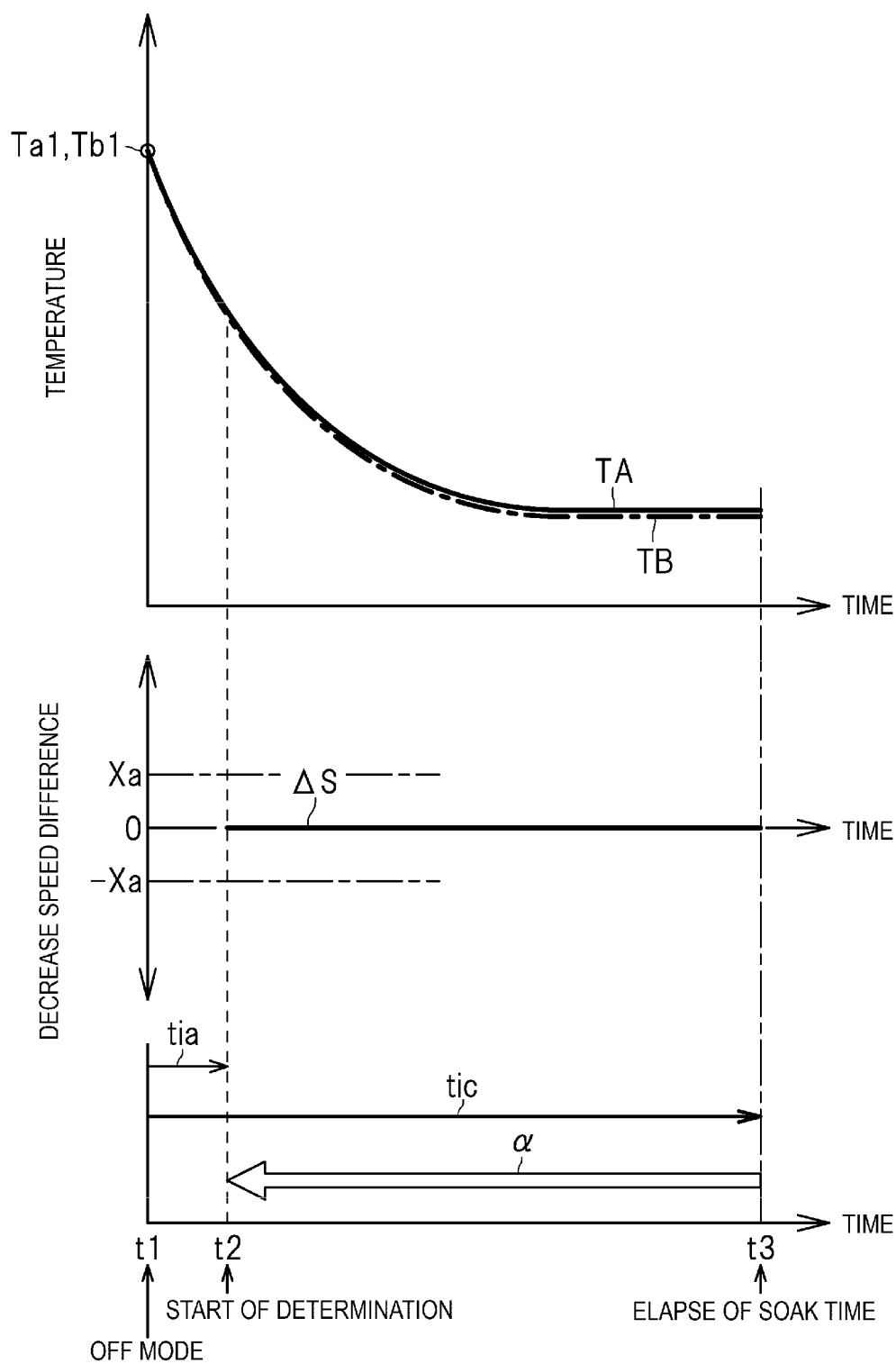
FIG. 12 illustrates transitions of the sensor temperatures in the diagnosis case 3.
Figure 13:
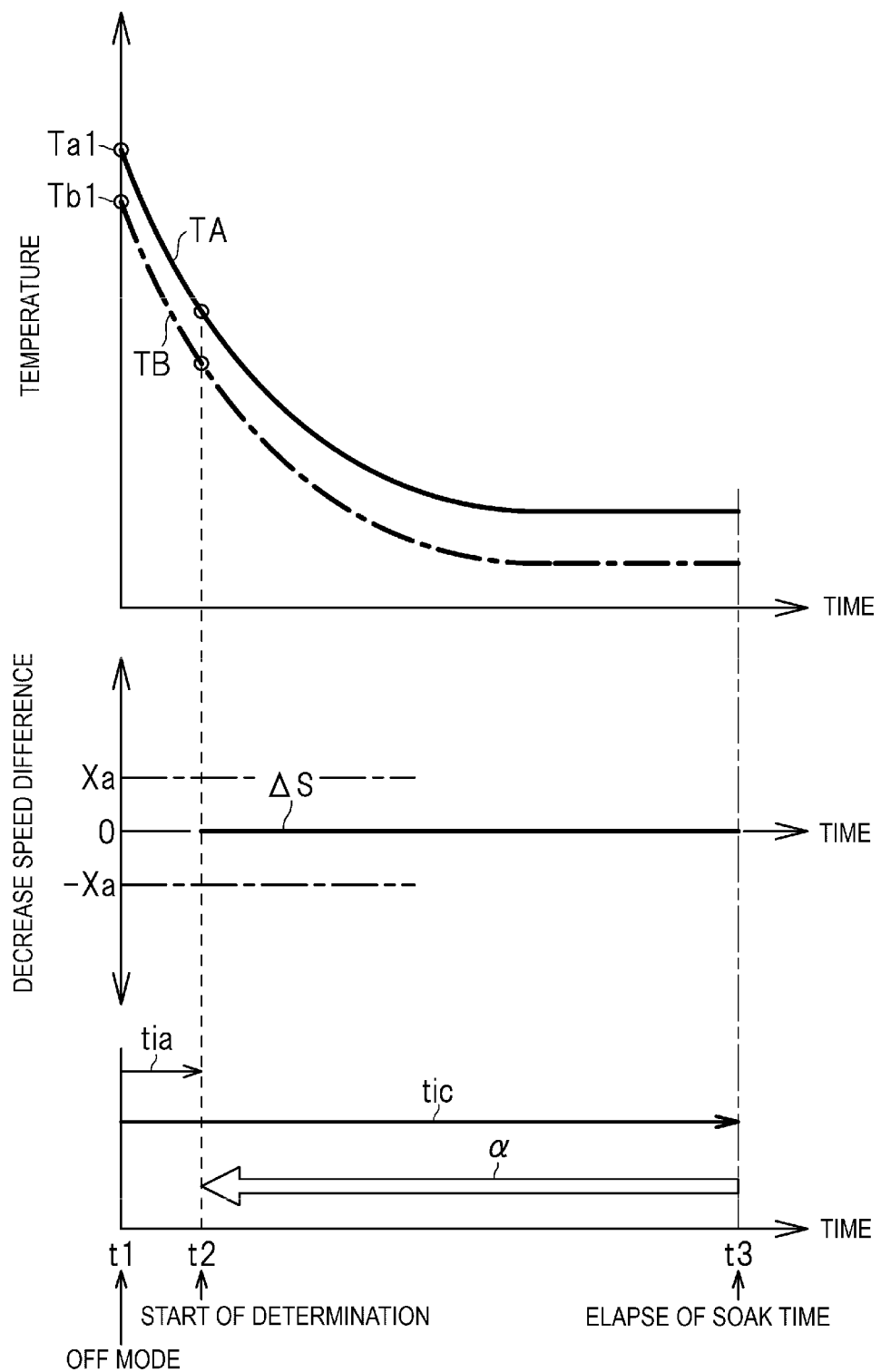
FIG. 13 illustrates transitions of the sensor temperatures in the diagnosis case 4.
Figure 14:
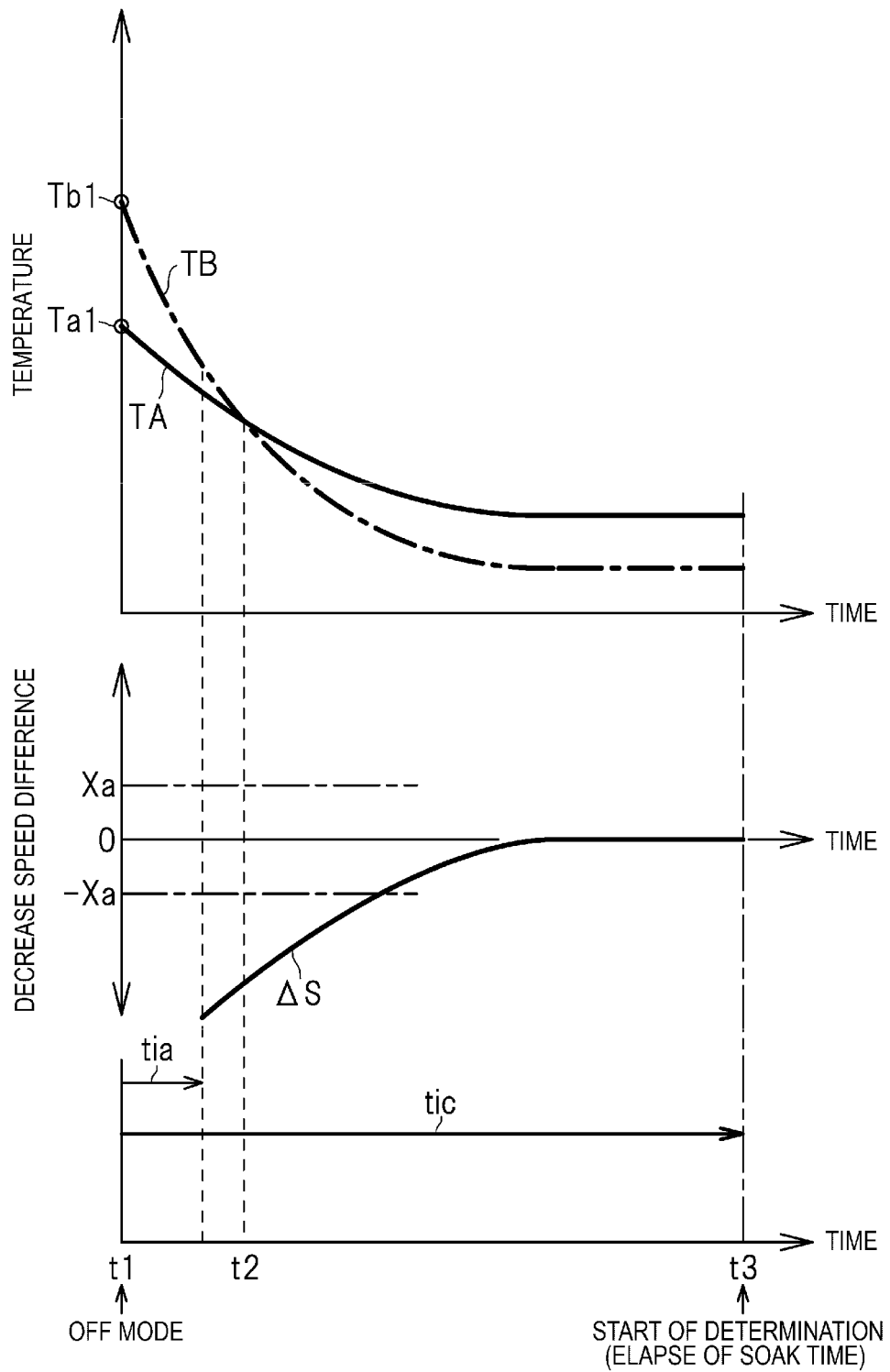
FIG. 14 illustrates transitions of the sensor temperatures in the diagnosis case 5.
Figure 15:
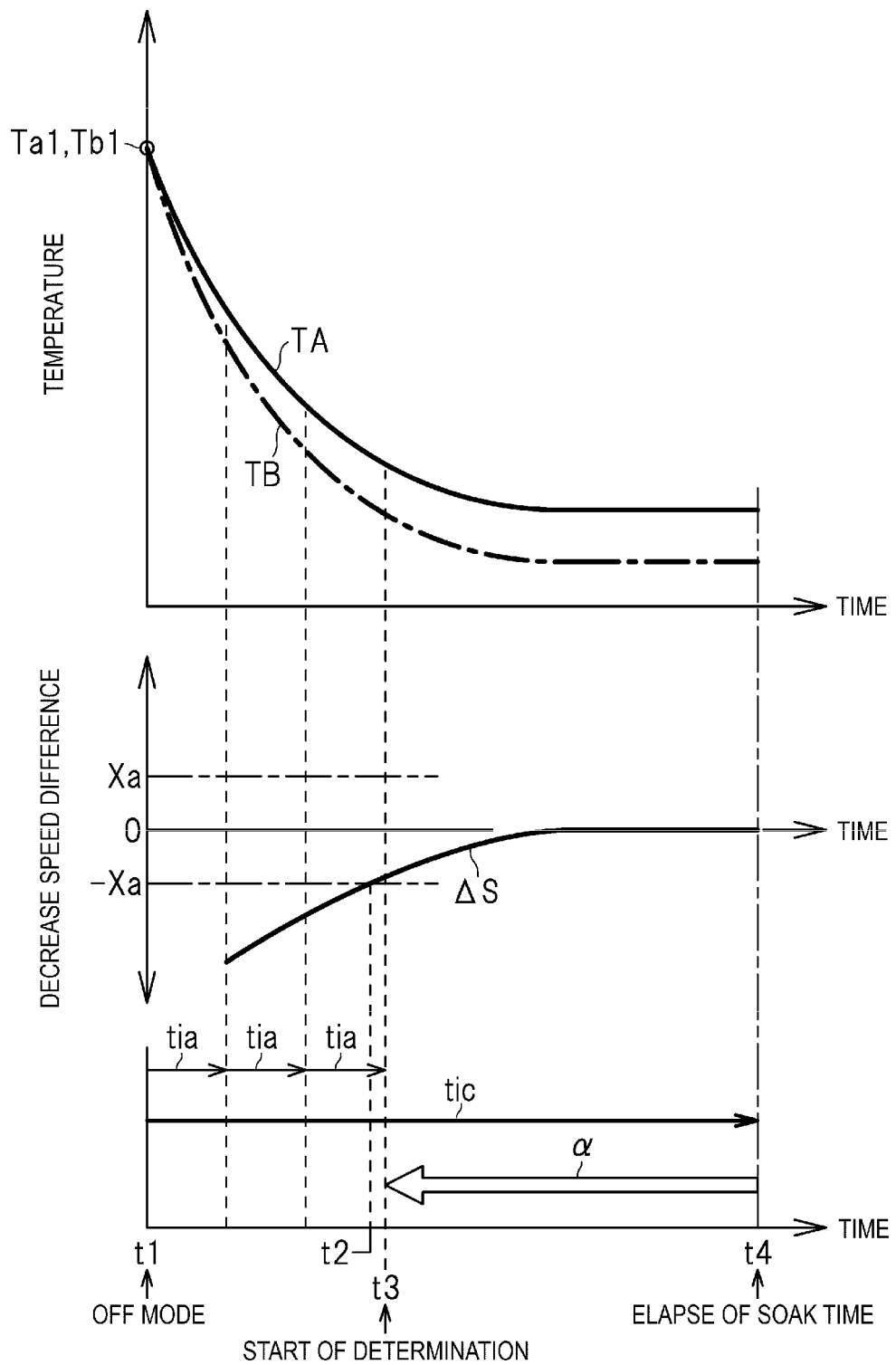
FIG. 15 illustrates transitions of the sensor temperatures in the diagnosis case 6.
Figure 16:
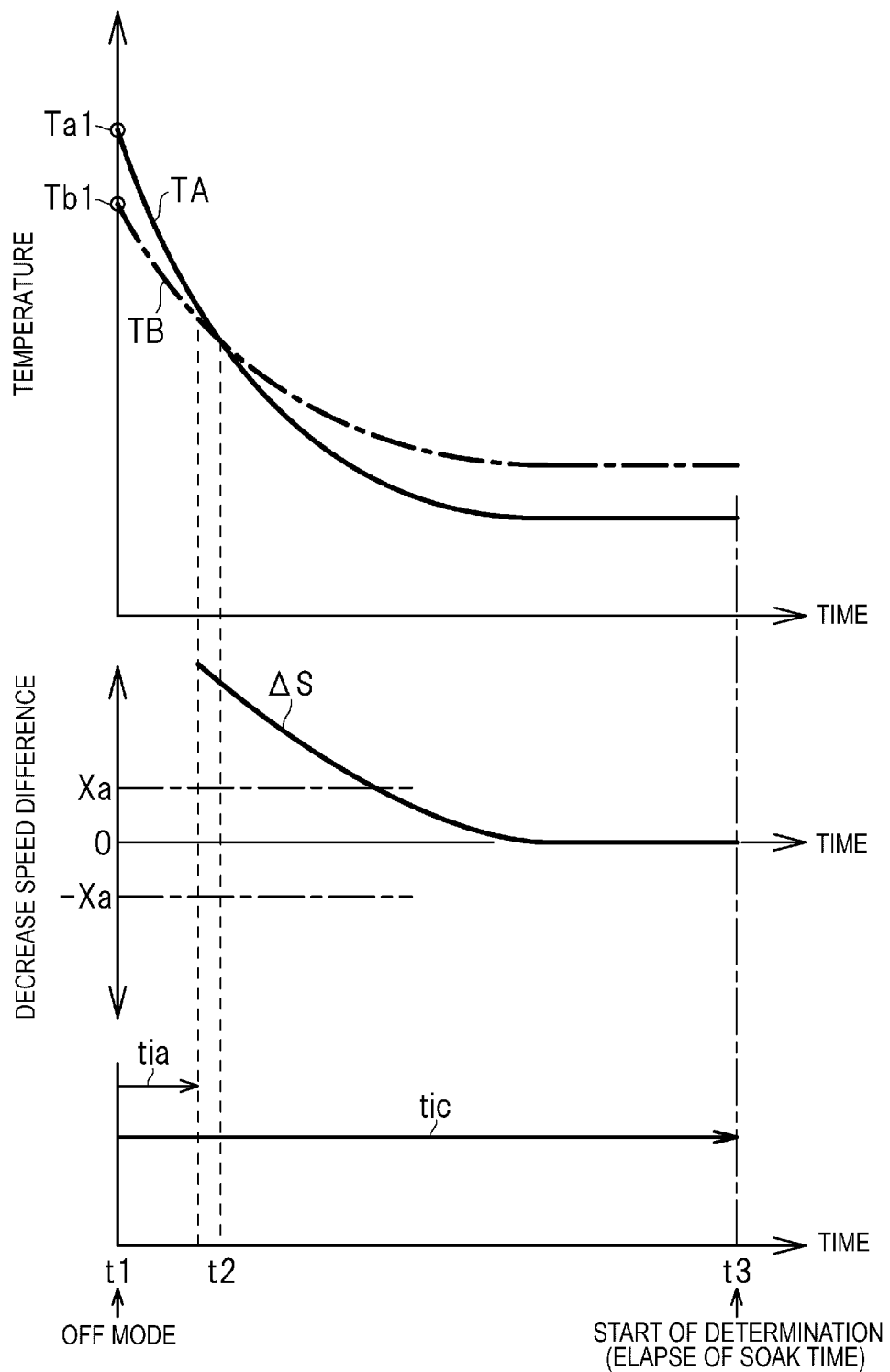
FIG. 16 illustrates transitions of the sensor temperatures in the diagnosis case 7.
Figure 17:
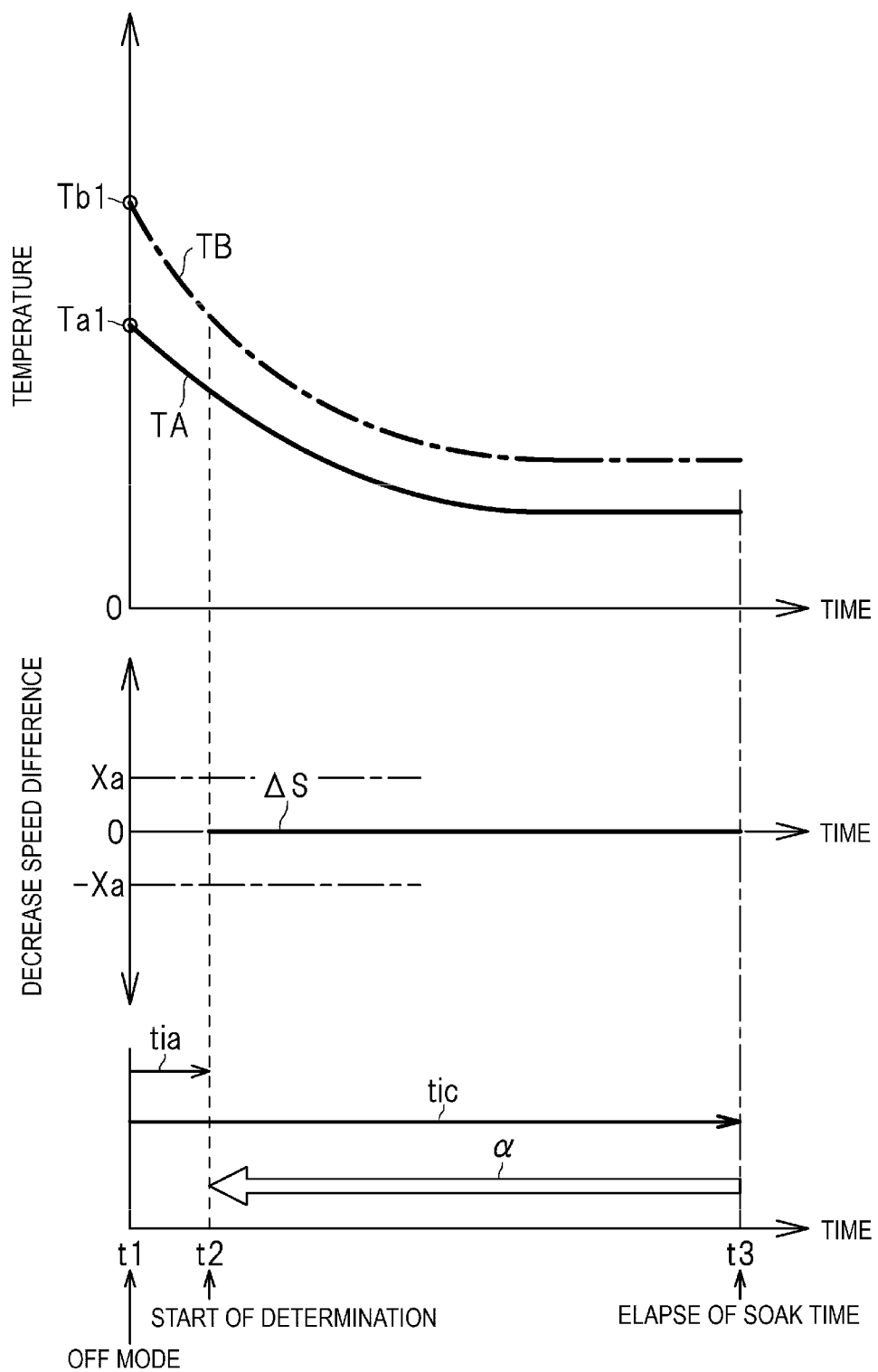
FIG. 17 illustrates transitions of the sensor temperatures in the diagnosis case 8.
Figure 18:
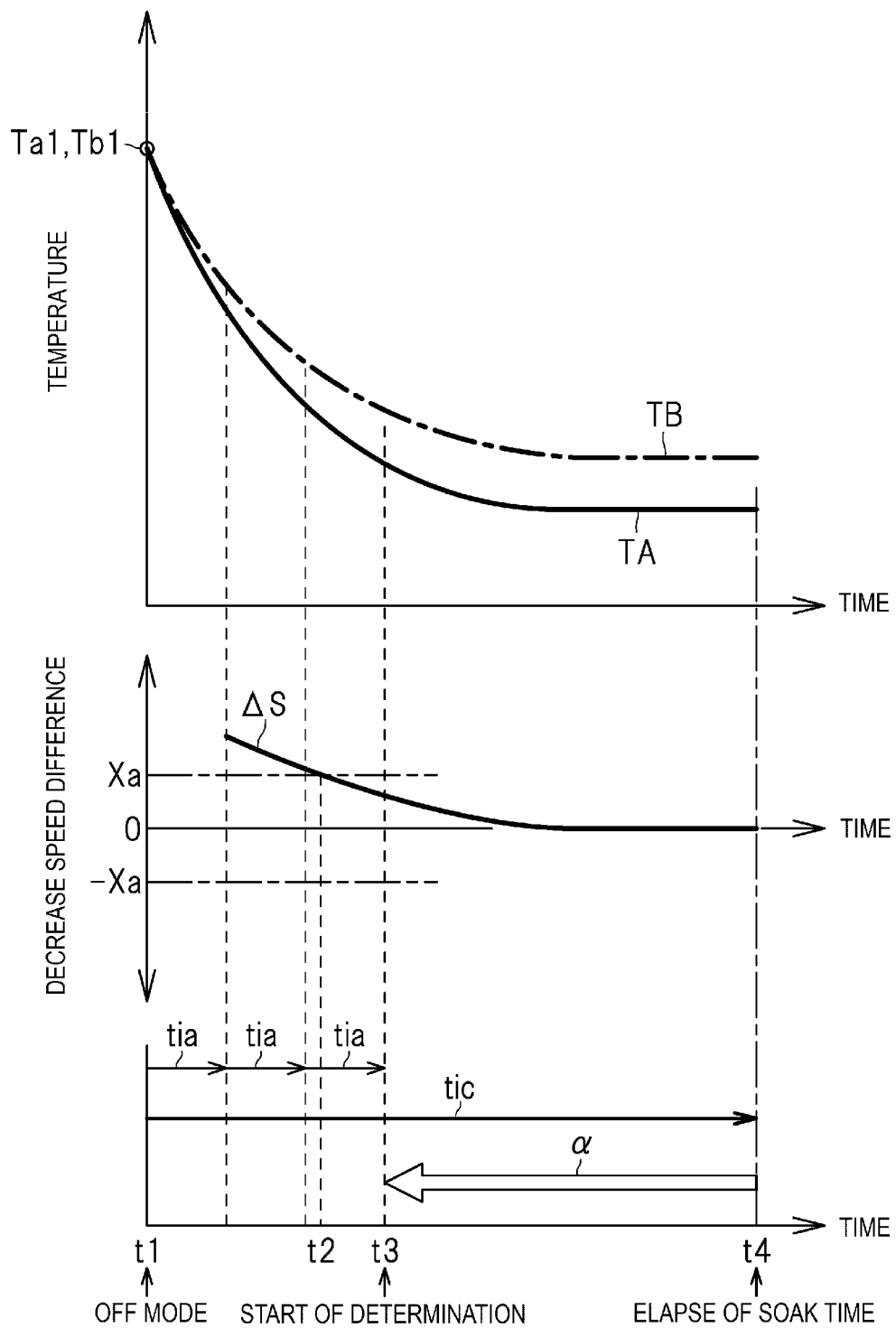
FIG. 18 illustrates transitions of the sensor temperatures in the diagnosis case 9.

Next, various diagnosis cases 1 to 9 in the sensor diagnostic control will be described. FIG. 9 illustrates conditions for diagnosis cases 1 to 9. FIG. 10 illustrates transitions of the sensor temperatures TA, TB in the diagnosis case 1, FIG. 11 illustrates transitions of the sensor temperatures TA, TB in the diagnosis case 2, and FIG. 12 illustrates transitions of the sensor temperatures TA, TB in the diagnosis case 3. Furthermore, FIG. 13 illustrates transitions of the sensor temperatures TA, TB in the diagnosis case 4, FIG. 14 illustrates transitions of the sensor temperatures TA, TB in the diagnosis case 5, and FIG. 15 illustrates transitions of the sensor temperatures TA, TB in the diagnosis case 6. Moreover, FIG. 16 illustrates transitions of the sensor temperatures TA, TB in the diagnosis case 7, FIG. 17 illustrates transitions of the sensor temperatures TA, TB in the diagnosis case 8, and FIG. 18 illustrates transitions of the sensor temperatures TA, TB in the diagnosis case 9.

[Diagnosis Cases 1-3]

The diagnosis cases 1 to 3 will be described. As illustrated in FIG. 9, the diagnosis cases 1 to 3 are cases in a situation in which no offset abnormality occurs to the first and second temperature sensors 34, 44. In addition, the diagnosis case 1 is a case in a situation in which the initial temperature Ta1 is higher than the initial temperature Tb1, the diagnosis case 2 is a case in a situation in which the initial temperature Ta1 is lower than the initial temperature Tb1, and the diagnosis case 3 a case in a situation in which the initial temperature Ta1 is equal to the initial temperature Tb1.

As illustrated in FIG. 10, in the diagnosis case 1, the initial temperature Ta1 is higher than the initial temperature Tb1 as indicated at the time t1, and the sensor temperatures TA, TB are nearly equal at the time of the elapse of the soak time tic as indicated at the time t4. That is, a temperature decrease amount of the sensor temperature TA is greater than a temperature decrease amount of the sensor temperature TB. Therefore, the decrease speed of the sensor temperature TA is faster than the decrease speed of the sensor temperature TB and a decrease speed difference ΔS between the sensor temperatures TA, TB appears on a positive side. In the diagnosis case 1, the absolute value of the decrease speed difference ΔS is smaller than the threshold Xa as indicated at the time t2. Therefore, at the time t3 of the elapse of the sampling time tia, the determination as to whether an abnormality has occurred in the first and second temperature sensors 34, 44 is started. As indicated by an arrow a, it is thereby possible to greatly advance the determination start timing and early determine whether the sensor abnormality has occurred, compared with a case of waiting for the elapse of the soak time tic.

As illustrated in FIG. 11, in the diagnosis case 2, the initial temperature Ta1 is lower than the initial temperature Tb1 as indicated at the time t1, and the sensor temperatures TA, TB are nearly equal at the time of the elapse of the soak time tic as indicated at the time t4. That is, the temperature decrease amount of the sensor temperature TB is greater than the temperature decrease amount of the sensor temperature TA. Therefore, the decrease speed of the sensor temperature TB is faster than the decrease speed of the sensor temperature TA and the decrease speed difference ΔS between the sensor temperatures TA, TB appears on a negative side. In the diagnosis case 2, the absolute value of the decrease speed difference ΔS is smaller than the threshold Xa as indicated at the time t2. Therefore, at the time t3 of the elapse of the sampling time tia, the determination as to whether abnormality has occurred in the first and second temperature sensors 34, 44 is started. As indicated by an arrow a, it is thereby possible to greatly advance the determination start timing and early determine whether the sensor abnormality has occurred, compared with a case of waiting for the elapse of the soak time tic.

As illustrated in FIG. 12, in the diagnosis case 3, the initial temperature Ta1 is equal to the initial temperature Tb1 as indicated at the time t1, and the sensor temperatures TA, TB are nearly equal at the time of the elapse of the soak time tic as indicated at the time t3. That is, the temperature decrease amounts of the sensor temperatures TA, TB are nearly equal. Therefore, the decrease speeds of the sensor temperatures TA, TB are nearly equal and the decrease speed difference ΔS between the sensor temperatures TA, TB appears near zero. In the diagnosis case 3, at the time t2 of the elapse of the sampling time tia, the absolute value of the decrease speed difference ΔS is smaller than the threshold Xa and, therefore, the determination as to whether an abnormality has occurred in the first and second temperature sensors 34, 44 is started. As indicated by an arrow a, it is thereby possible to greatly advance the determination start timing and early determine whether the sensor abnormality has occurred, compared with a case of waiting for the elapse of the soak time tic.

[Diagnosis Cases 4-6]

The diagnosis cases 4 to 6 will be described. As illustrated in FIG. 9, the diagnosis cases 4 to 6 are cases in a situation in which a downward offset abnormality occurs to the second temperature sensor 44. In addition, the diagnosis case 4 is a case in a situation in which the initial temperature Ta1 is higher than the initial temperature Tb1, the diagnosis case 5 is a case in a situation in which the initial temperature Ta1 is lower than the initial temperature Tb1, and the diagnosis case 6 is a case in a situation in which the initial temperature Ta1 is equal to the initial temperature Tb1.

As illustrated in FIG. 13, in the diagnosis case 4, the initial temperature Ta1 is higher than the initial temperature Tb1 as indicated at the time t1, and the sensor temperature TA is higher than the sensor temperature TB after elapse of the soak time tic as indicated at the time t3. That is, there is no large difference between the temperature decrease amounts of the sensor temperatures TA, TB. Therefore, the decrease speeds of the sensor temperatures TA, TB are nearly equal and the decrease speed difference ΔS between the sensor temperatures TA, TB appears near zero. In the diagnosis case 4, at the time t2 of the elapse of the sampling time tia, the absolute value of the decrease speed difference ΔS is smaller than the threshold Xa. Therefore, the determination as to whether an abnormality has occurred in the first and second temperature sensors 34, 44 is started. As indicated by an arrow a, it is thereby possible to greatly advance the determination start timing and early determine whether the sensor abnormality has occurred, compared with a case of waiting for the elapse of the soak time tic.

As illustrated in FIG. 14, in the diagnosis case 5, the initial temperature Ta1 is lower than the initial temperature Tb1 as indicated at the time t1, and the sensor temperature TA is higher than the sensor temperature TB at the time of the elapse of the soak time tic as indicated at the time t3. That is, the temperature decrease amount of the sensor temperature TB is far greater than the temperature decrease amount of the sensor temperature TA. Therefore, the decrease speed of the sensor temperature TB is far faster than the decrease speed of the sensor temperature TA and the decrease speed difference ΔS between the sensor temperatures TA, TB largely appears on the negative side. In this way, in the diagnosis case 5 with the large decrease speed difference ΔS, it is predicted that the magnitude relation between the sensor temperatures TA, TB will be reversed halfway as indicated at the time t2. In this case, it is difficult to set the start timing of the determination based on the decrease speed difference ΔS. Therefore, at the time t3 of the elapse of the soak time tic, the determination as to whether an abnormality has occurred in the first and second temperature sensors 34, 44 is started. It is thereby possible to stabilize the sensor temperatures TA, TB using the soak time tic and appropriately determine whether the sensor abnormality has occurred.

As illustrated in FIG. 15, in the diagnosis case 6, the initial temperature Ta1 is equal to the initial temperature Tb1 as indicated at the time t1, and the sensor temperature TA is higher than the sensor temperature TB at the time of the elapse of the soak time tic as indicated at the time t4. That is, the temperature decrease amount of the sensor temperature TB is greater than the temperature decrease amount of the sensor temperature TA. Therefore, the decrease speed of the sensor temperature TB is faster than the decrease speed of the sensor temperature TA and the decrease speed difference ΔS between the sensor temperatures TA, TB appears on a negative side. In the diagnosis case 6, the absolute value of the decrease speed difference ΔS is smaller than the threshold Xa as indicated at the time t2. Therefore, at the time t3 of the elapse of the sampling time tia, the determination as to whether an abnormality has occurred in the first and second temperature sensors 34, 44 is started. As indicated by an arrow a, it is thereby possible to greatly advance the determination start timing and early determine whether the sensor abnormality has occurred, compared with a case of waiting for the elapse of the soak time tic.

[Diagnosis Cases 7-9]

The diagnosis cases 7 to 9 will be described. As illustrated in FIG. 9, the diagnosis cases 7 to 9 are cases in a situation in which an upward offset abnormality occurs to the second temperature sensor 44. In addition, the diagnosis case 7 is a case in a situation in which the initial temperature Ta1 is higher than the initial temperature Tb1, the diagnosis case 8 is a case in a situation in which the initial temperature Ta1 is lower than the initial temperature Tb1, and the diagnosis case 9 is a case in a situation in which the initial temperature Ta1 is equal to the initial temperature Tb1.

As illustrated in FIG. 16, in the diagnosis case 7, the initial temperature Ta1 is higher than the initial temperature Tb1 as indicated at the time t1, and the sensor temperature TA is lower than the sensor temperature TB at the time of the elapse of the soak time tic as indicated at the time t3. That is, the temperature decrease amount of the sensor temperature TA is far greater than the temperature decrease amount of the sensor temperature TB. Therefore, the decrease speed of the sensor temperature TA is far faster than the decrease speed of the sensor temperature TB and the decrease speed difference ΔS between the sensor temperatures TA, TB largely appears on the positive side. In this way, in the diagnosis case 7 with the large decrease speed difference ΔS, it is predicted that the magnitude relation between the sensor temperatures TA, TB will be reversed halfway as indicated at the time t2. In this case, it is difficult to set the start timing of the determination based on the decrease speed difference ΔS. Therefore, at the time t3 of the elapse of the soak time tic, the determination as to whether an abnormality has occurred in the first and second temperature sensors 34, 44 is started. It is thereby possible to stabilize the sensor temperatures TA, TB using the soak time tic and appropriately determine whether the sensor abnormality has occurred.

As illustrated in FIG. 17, in the diagnosis case 8, the initial temperature Ta1 is lower than the initial temperature Tb1 as indicated at the time t1, and the sensor temperature TA is lower than the sensor temperature TB at the time of the elapse of the soak time tic as indicated at the time t3. That is, there is no large difference between the temperature decrease amounts of the sensor temperatures TA, TB. Therefore, the decrease speeds of the sensor temperatures TA, TB are nearly equal and the decrease speed difference ΔS between the sensor temperatures TA, TB appears near zero. In the diagnosis case 8, at the time t2 of the elapse of the sampling time tia, the absolute value of the decrease speed difference ΔS is smaller than the threshold Xa. Therefore, the determination as to whether an abnormality has occurred in the first and second temperature sensors 34, 44 is started. As indicated by an arrow a, it is thereby possible to greatly advance the determination start timing and early determine whether the sensor abnormality has occurred, compared with a case of waiting for the elapse of the soak time tic.

As illustrated in FIG. 18, in the diagnosis case 9, the initial temperature Ta1 is equal to the initial temperature Tb1 as indicated at the time t1, and the sensor temperature TB is higher than the sensor temperature TA at the time of the elapse of the soak time tic as indicated at the time t4. That is, a temperature decrease amount of the sensor temperature TA is greater than a temperature decrease amount of the sensor temperature TB. Therefore, the decrease speed of the sensor temperature TA is faster than the decrease speed of the sensor temperature TB and a decrease speed difference ΔS between the sensor temperatures TA, TB appears on a positive side. In the diagnosis case 9, the absolute value of the decrease speed difference ΔS is smaller than the threshold Xa as indicated at the time t2. Therefore, at the time t3 of the elapse of the sampling time tia, the determination as to whether an abnormality has occurred in the first and second temperature sensors 34, 44 is started. As indicated by an arrow a, it is thereby possible to greatly advance the determination start timing and early determine whether the sensor abnormality has occurred, compared with a case of waiting for the elapse of the soak time tic.

It goes without saying that the disclosure is not limited to the embodiment described above and various changes and modifications can be made without departing from the spirit of the disclosure. While the electric vehicle 11 is referred to as an example of the vehicle including the first temperature sensor 34 and the second temperature sensor 44 in the descriptions above, the disclosure is not limited to the electric vehicle 11. For example, the sensor diagnostic device 10 according to the present embodiment may be applied to a vehicle including merely an engine as a power source. For example, the sensor diagnostic device 10 according to the present embodiment may be applied to a vehicle including an engine and a motor-generator as a power source. In addition, a control system configured with one control unit or a control system configured with multiple control units may be used as the control system 50 executing the sensor diagnostic control.

The sensor diagnostic device 10 executes the sensor diagnostic control on the first temperature sensor 34 and the second temperature sensor 44 that are provided in the battery pack 22 in the descriptions above. However, the disclosure is not limited to this example. That is, the temperature sensor subjected to the sensor diagnostic control may be, for example, a temperature sensor detects the temperature of the coolant of an engine, a temperature sensor detecting the temperature of the hydraulic oil of a transmission, or a temperature sensor detecting an intake air temperature of an engine. Furthermore, targets the temperatures of which are to be detected by the first temperature sensor and the second temperature sensor may be either the same target or different targets. That is, if the target to be cooled down to the same temperature after stopping of the vehicle, the target may be different targets. Moreover, any form of the temperature sensor subjected to the sensor diagnostic control may be applicable. For example, a temperature sensor configured with a thermister, a temperature sensor configured with semiconductor elements, or a temperature sensor configured with a thermocouple may be applied to the temperature sensor subjected to the sensor diagnostic control.

As illustrated in the flowchart of FIG. 5, the decrease speeds Sa1, Sb1 of the sensor temperatures TA, TB are calculated in Step S22, and the decrease speeds San, Sbn of the sensor temperatures TA, TB are calculated in Step S32. In these Steps S22, S32, the decrease speeds Sa1, San may be calculated by differentiating the sensor temperature TA and the decrease speeds Sb1, Sbn may be calculated by differentiating the sensor temperature TB. Furthermore, as illustrated in FIG. 6, whether the magnitude relation between the sensor temperatures TA, TB will be reversed is predicated using the linear approximate lines LA, LB. However, the disclosure is not limited to this example. Whether the magnitude relation between the sensor temperatures TA, TB will be reversed may be predicated using other approximate curves.

The invention claimed is:

1. A sensor diagnostic device for use in a vehicle including a first temperature sensor and a second temperature sensor, the first temperature sensor being configured to detect a temperature of a first component of the vehicle and the second temperature sensor being configured to detect a temperature of a second component of the vehicle, the sensor diagnostic device being configured to detect a sensor abnormality of one or both of the first temperature sensor and the second temperature sensor, the sensor diagnostic device comprising
a control system comprising a processor and a memory that are communicably coupled to each other, the control system being configured to determine whether the sensor abnormality has occurred based on a detected temperature difference between a first detected temperature detected by the first temperature sensor and a second detected temperature detected by the second temperature sensor, wherein
after the vehicle is stopped, the control system is configured to:
calculate a temperature decrease rate of the first detected temperature based on the first detected temperature, and calculate a temperature decrease rate of the second detected temperature based on the second detected temperature;
determine whether an absolute value of a temperature decrease rate difference between the first temperature decrease rate and the second temperature decrease rate is smaller than a threshold; and
in response to determining that the absolute value of the temperature decrease rate difference is smaller than the threshold, determine whether the sensor abnormality has occurred, based on the detected temperature difference.

2. The sensor diagnostic device according to claim 1, wherein
the first component is a first battery module of a battery pack in the vehicle, and
the second component is a second battery module of the battery pack.

3. The sensor diagnostic device according to claim 1, wherein the control system is configured to predict whether a magnitude relation between the first detected temperature and the second detected temperature will be reversed within a specified time since the vehicle is stopped, based on approximate interpolation lines derived from at least two sampling points of the first and second detected temperatures.

4. The sensor diagnostic device according to claim 1, wherein the control system is configured to initiate determination of the sensor abnormality after elapse of an uncontrolled time that is longer than a specified time since the vehicle is stopped.

5. The sensor diagnostic device according to claim 1, wherein the control system is further configured to identify which one of the first temperature sensor and the second temperature sensor has the sensor abnormality, by comparing the first detected temperature and second detected temperature with an ambient temperature detected by a third temperature sensor.

6. A sensor diagnostic device for use in a vehicle including a first temperature sensor and a second temperature sensor, the sensor diagnostic device being configured to detect a sensor abnormality of one or both of the first temperature sensor and the second temperature sensor, the sensor diagnostic device comprising
a control system comprising a processor and a memory that are communicably coupled to each other, the control system being configured to determine whether the sensor abnormality has occurred based on a detected temperature difference between a first detected temperature detected by the first temperature sensor and a second detected temperature detected by the second temperature sensor, wherein
the control system is configured to, after the vehicle is stopped:
calculate a temperature decrease rate of the first detected temperature based on the first detected temperature, and calculate a temperature decrease rate of the second detected temperature based on the second detected temperature; and
in a case where an absolute value of a temperature decrease rate difference between the first detected temperature and the second detected temperature is smaller than a threshold, determine whether the sensor abnormality has occurred, based on the detected temperature difference, and
the control system is further configured to, after the vehicle is stopped:
predict whether a magnitude relation between the first detected temperature and the second detected temperature is to be reversed within a specified time since the vehicle is stopped, based on a transition of the first detected temperature and a transition of the second detected temperature, and
upon predicting that the magnitude relation between the first detected temperature and the second detected temperature is to be reversed, determine whether the sensor abnormality has occurred, based on the detected temperature difference after elapse of uncontrolled time longer than the specified time since the vehicle is stopped.

7. The sensor diagnostic device according to claim 6, wherein
the control system is configured to:
in determining whether the sensor abnormality has occurred in response to the absolute value of the temperature decrease rate difference being smaller than the threshold, determine that the sensor abnormality has occurred in a case where an absolute value of the detected temperature difference is greater than a first temperature difference threshold, and
in determining whether the sensor abnormality has occurred in response to the elapse of the uncontrolled time, determine that the sensor abnormality has occurred in a case where the absolute value of the detected temperature difference is greater than a second temperature difference threshold smaller than the first temperature difference threshold.

* * * * *